United States Patent [19]

Herbison et al.

[11] Patent Number: 4,924,513

[45] Date of Patent: May 8, 1990

[54] APPARATUS AND METHOD FOR SECURE TRANSMISSION OF DATA OVER AN UNSECURE TRANSMISSION CHANNEL

[75] Inventors: B. J. Herbison, Clinton, Mass.; Carter Lyman, Merrimack, N.H.; Paul Karger, Acton, Mass.; Bruce Mann, Mason, N.H.; Steve Lipner, Wellesley, Mass.; Arnold Miller, Austin, Tex.

[73] Assignee: Digital Equipment Corporation, Maynard, Mass.

[21] Appl. No.: 338,234

[22] Filed: Apr. 14, 1989

Related U.S. Application Data

[62] Division of Ser. No. 101,125, Sep. 25, 1987, Pat. No. 4,881,263.

[51] Int. Cl.⁵ .............................................. H04L 9/02
[52] U.S. Cl. ...................................... 380/21; 380/25; 380/29; 380/43; 380/50
[58] Field of Search ............................... 364/200, 900; 380/23–25, 43, 44, 47, 49, 20, 21, 29, 50; 340/825.31, 825.34

[56] References Cited

U.S. PATENT DOCUMENTS

| | | | |
|---|---|---|---|
| 4,438,824 | 3/1984 | Mueller-Schloer | 380/23 |
| 4,533,948 | 8/1985 | McNamara et al. | 380/23 X |
| 4,535,355 | 8/1985 | Arn et al. | 380/43 X |
| 4,578,531 | 3/1986 | Everhart et al. | 380/23 X |
| 4,736,422 | 4/1988 | Mason | 380/21 X |
| 4,747,050 | 5/1988 | Brachtl et al. | 380/24 X |
| 4,771,458 | 9/1988 | Citta et al. | 380/21 X |
| 4,803,725 | 2/1989 | Horne et al. | 380/44 |
| 4,829,569 | 5/1989 | Seth-Smith et al. | 380/20 X |

*Primary Examiner*—Stephen C. Buczinski
*Assistant Examiner*—Bernarr Earl Gregory
*Attorney, Agent, or Firm*—Finnegan, Henderson, Farabow, Garrett and Dunner

[57] ABSTRACT

Apparatus and methods, readily adapted to interface with a standard data transmission network having an unsecure transmission channel, e.g., "Ethernet," for the provision of secure transmission of data over the network channel in a manner which is essentially transparent to the standard network devices and users, thereof, are provided. Various encryption keys are generated and utilized within the system to disguise or encrypt information transferred between network nodes. The encryption keys are made known only to those network devices which are permitted to handle information encrypted with the encryption keys.

19 Claims, 17 Drawing Sheets

FIG. 3

TM/RM DATA PACKET

| | Data Field | No. of Bytes | Encryption Status |
|---|---|---|---|
| 1. | DESTINATION NODE ADDR | 6 | C |
| 2. | SOURCE NODE ADDR | 6 | C |
| 3. | PROTOCOL TYPE | 2 | C |
| 4. | DATA | 46-1464 | C |
| 5. | INTEGRITY CHECK CODE | 4 | C |

FIG. 4

AR DATA PACKET

| Data Field | No. of Bytes | Encryption Status |
|---|---|---|
| 1. MESSAGE TYPE | 2 | C |
| 2. ENCRYPTION KEY IDENTIFIER | 2 | C |
| 3. SEQUENCE NO. | 4 | C |
| 4. MESSAGE TYPE (COPY) | 2 | C |
| 5. SOURCE NODE ADDR | 6 | C |
| 6. DESTINATION NODE ADDR | 6 | C |
| 7. ASSOCIATION TIME | 10 | C |

FIG. 5

AO DATA PACKET

| | Data Field | No. of Bytes | Encryption Status | Key |
|---|---|---|---|---|
| 1. | MESSAGE TYPE | 2 | C | |
| 2. | ENCRYPTION KEY IDENTIFIER | 2 | C | |
| 3. | SEQUENCE NO. | 4 | E | $MK_A$ |
| 4. | MESSAGE TYPE (COPY) | 2 | E | $MK_A$ |
| 5. | KDC NODE ADDR | 6 | E | $MK_A$ |
| 6. | SOURCE NODE ADDR | 6 | E | $MK_A$ |
| 7. | DESTINATION NODE ADDR | 6 | E | $MK_A$ |
| 8. | ASSOCIATION FLAGS | 2 | E | $MK_A$ |
| 9. | ASSOCIATION KEY | 20 | E | $MK_A$ |
| 10. | INTEGRITY CHECK CODE TYPE | 2 | E | $MK_A$ |
| 11. | PADDING | - | E | $MK_A$ |
| 12. | ASSOCIATION FORWARD DATA PACKET | 12 | E | $MK_N$-$MK_A$* |
| 13. | INTEGRITY CHECK CODE | 2 | E | |

*The association Forward Data Packet in field 12 is double encrypted, first using the $MK_N$, then with fields 2-13 using $MK_A$. (See the description of steps 246 and 248 in the specification.)

FIG. 6

AF DATA PACKET

| | Data Field | No. of Bytes | Encryption Status | Key |
|---|---|---|---|---|
| 1. | MESSAGE TYPE | 2 | C | |
| 2. | ENCRYPTION KEY IDENTIFIER | 2 | C | |
| 3. | SEQUENCE NO. | 4 | E | $MK_N$ |
| 4. | MESSAGE TYPE (COPY) | 2 | E | $MK_N$ |
| 5. | KDC NODE ADDR | 6 | E | $MK_N$ |
| 6. | SOURCE NODE ADDR | 6 | E | $MK_N$ |
| 7. | DESTINATION NODE ADDR | 6 | E | $MK_N$ |
| 8. | ASSOCIATION FLAGS | 2 | E | $MK_N$ |
| 9. | ASSOCIATION KEY | 20 | E | $MK_N$ |
| 10. | INTEGRITY CHECK CODE TYPE | 2 | E | $MK_N$ |
| 11. | PADDING | - | E | $MK_N$ |
| 12. | INTEGRITY CHECK CODE | 2 | E | |

FIG. 7

IDX DATA PACKET

| | Data Field | No. of Bytes | Encryption Status | Key |
|---|---|---|---|---|
| 1. | MESSAGE TYPE | 2 | C | |
| 2. | ENCRYPTION KEY IDENTIFIER | 2 | C | |
| 3. | SEQUENCE NO. | 4 | E | AK |
| 4. | MESSAGE TYPE (COPY) | 2 | E | AK |
| 5. | ASSOC. RECORD LOCATION | 2 | E | AK |
| 6. | PADDING | - | E | AK |
| 7. | INTEGRITY CHECK CODE | 2 | E | |

FIG. 8

EM DATA PACKET

| | Data Field | No. of Bytes | Encryption Status | Key |
|---|---|---|---|---|
| 1. | MESSAGE TYPE | 2 | C | |
| 2. | ENCRYPTION KEY IDENTIFIER | 2 | C | |
| 3. | ORIGINAL HEADER | 10 | E | AK |
| 4. | SEQUENCE NO. | 4 | E | AK |
| 5. | MESSAGE TYPE (COPY) | 2 | E | AK |
| 6. | DATA | 46-1464 | E | AK |
| 7. | PADDING | - | E | AK |
| 8. | INTEGRITY CHECK CODE | 2 | E | |

FIG. 10

IR DATA PACKET

| | Data Field | No. of Bytes | Encryption Status |
|---|---|---|---|
| 1. | MESSAGE TYPE | 2 | C |
| 2. | ENCRYPTION KEY IDENTIFIER | 2 | C |
| 3. | SEQUENCE NO. | 4 | C |
| 4. | MESSAGE TYPE (COPY) | 2 | C |
| 5. | ENCRYPTION CONTROLLER HARDWARE VERION NUMBER | 4 | C |

FIG. 11

INITIALIZATION MESSAGE

| | Data Field | No. of Bytes | Encryption Status | Key |
|---|---|---|---|---|
| 1. | MESSAGE TYPE | 2 | C | |
| 2. | ENCRYPTION KEY IDENTIFIER | 2 | C | |
| 3. | SEQUENCE NO. | 4 | E | IK |
| 4. | MESSAGE TYPE (COPY) | 2 | E | IK |
| 5. | KDC NODE ADDR | 6 | E | IK |
| 6. | ENCRYPTION CONTROLLER ADDR | 4 | E | IK |
| 7. | MASTER KEY | 12 | E | IK |
| 8. | MASTER INTEGRITY CHECK CODE TYPE | 2 | E | IK |
| 9. | SERVICE KEY | 12 | E | IK |
| 10. | SERVICE INTEGRITY CHECK CODE TYPE | 2 | E | IK |
| 11. | PADDING | - | E | IK |
| 12. | INTEGRITY CHECK CODE | 2 | E | |

FIG. 12

CS DATA PACKET

| Data Field | No. of Bytes | Encryption Status | Key |
|---|---|---|---|
| 1. MESSAGE TYPE | 2 | C | |
| 2. ENCRYPTION KEY IDENTIFIER | 2 | C | |
| 3. SEQUENCE NO. | 4 | E | MK* |
| 4. MESSAGE TYPE (COPY) | 2 | E | MK* |
| 5. KDC NODE ADDR | 6 | E | MK* |
| 6. ENCRYPTION CONTROLLER STATE | 2 | E | MK* |
| 7. PADDING | - | E | MK* |
| 8. INTEGRITY CHECK CODE | 2 | E | |

*Master Key for Encryption Controller Being Initialized

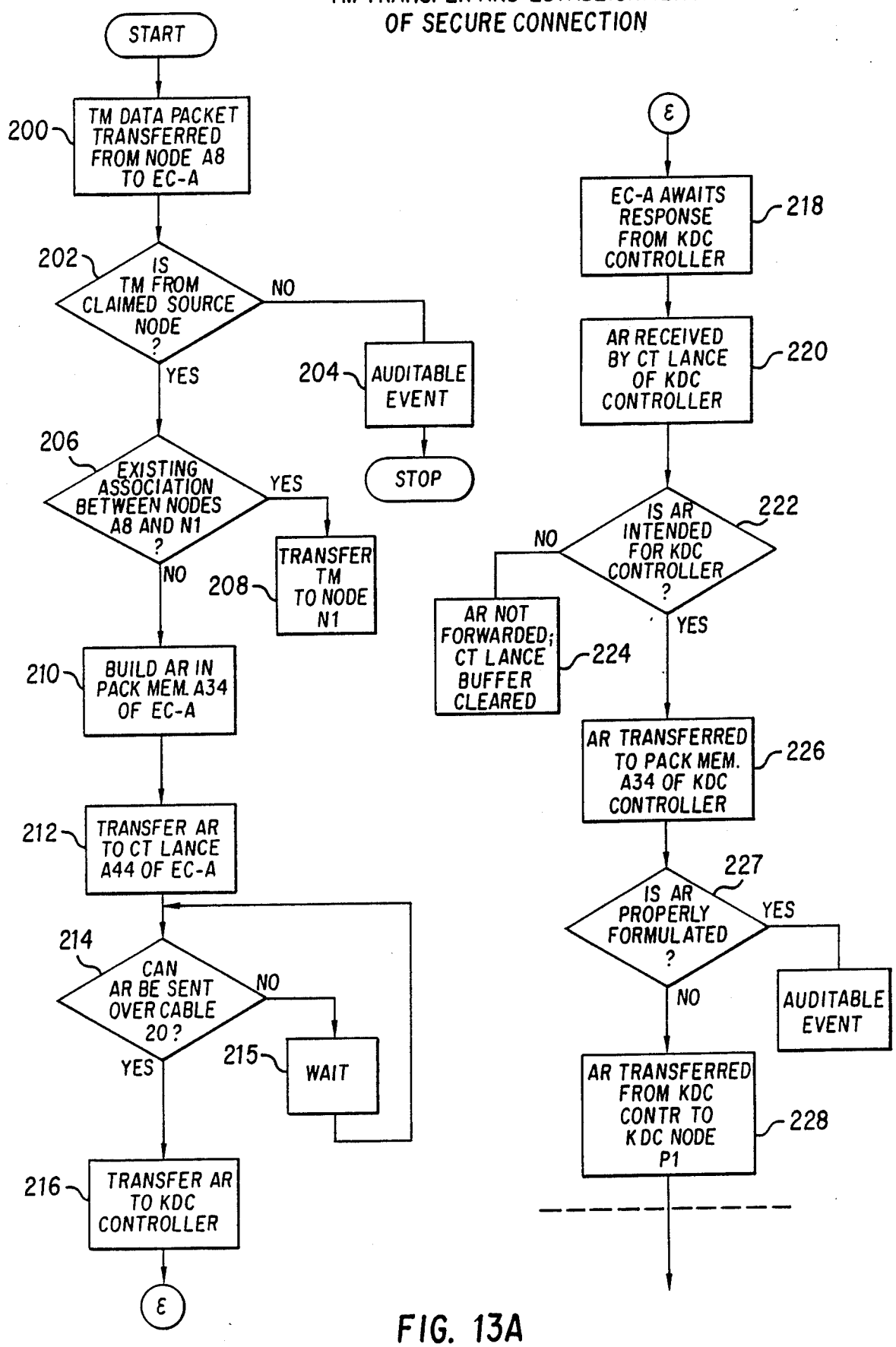
FIG. 13A — TM TRANSFER AND ESTABLISHMENT OF SECURE CONNECTION

4,924,513

APPARATUS AND METHOD FOR SECURE TRANSMISSION OF DATA OVER AN UNSECURE TRANSMISSION CHANNEL

This is a division of application Ser. No. 07/101,125, filed Sept. 25, 1987, now U.S. Pat. No. 4,881,263.

FIELD OF THE INVENTION

This invention pertains to transmission of data over local area networks, e.g., "Ethernet", and, more particularly, to apparatus and methods for secure transmission of data over such networks even though such networks are themselves unsecured.

BACKGROUND OF THE INVENTION

The advent of the local area network (LAN) has greatly extended the power of the computer by providing the freedom of efficient and high speed communications between host computers and other devices (nodes) within a geographical region. Many buildings and complexes of buildings such as college campuses are now wired for various mixes of LANs, extended-LANs, and wide area networks (WANs).

It is not uncommon to see LANs with several hundred or even thousands of nodes. LANs can be used as hops or segments in larger wide area networks, containing many thousands of nodes. Current trends are placing more of the essential services and resources associated with computers on networks where they can be shared by many users. Local area terminal concentrators (LATs) provide flexibility not possible with terminals that are hard-wired to a particular computer.

Local area print servers eliminate the necessity of dedicating a printer to each computer and permit the efficient use of multiple device types by sharing their resources among the computers they serve. Local area file and disk servers permit the shared use of large data bases without the necessity and cost of maintaining multiple copies of the data bases on each computer.

This flexibility and efficiency, however, poses severe security risks not addressed by most local network architectures. Information sent over the network is available to all devices connected to . For example, when a user logs onto a computer over the network via a terminal concentrator his password a pears in the clear, that is, undisguised at every node on the network. The same is true with every file transferred to or from a file server or every document printed by a print server. While most nodes will normally only receive information or packets addressed to them or to multicast packets, any node can be easily programmed to receive packets for any other address, send packets claiming to be any source node, or be in a "promiscuous" mode and receive all packets.

While data transmission networks have been designed to include devices such as encryption/decryption units which permit secure handling of data, the devices used in such networks are commonly designed only for point-to-point links. Such devices are specially designed, tend to be complex and expensive, and cannot be applied to a multi-system bus like, for example, "Ethernet."

Specifically, conventional encryption/decryption units for existing networks have included encryption control apparatus specifically designed for use with nodes of only a given transmission bus/local area network combination. The encryption control apparatus have not typically operated external to the encryption/decryption units to control encryption across a transmission bus. The conventional encryption/decryption units have been used in connection with encryption keys, one such encryption key being used for each transmission session between any two points, or nodes in the network.

Given the network-specific design of conventional encryption/decryption devices, such devices have been incapable of generic application to a variety of networks. Also, the use of unique keys to encrypt/decrypt each transmission has required generation and storage of numerous keys and has resulted in the need for complex protocols for generating and utilizing the numerous keys.

OBJECTS AND SUMMARY OF THE INVENTION

It is therefore an object of the present invention to provide apparatus and methods readily adapted to interface with a standard data transmission network, e.g., "Ethernet," for the provision of secure transmission of data over the network in a manner which is essentially transparent to the standard network devices and users thereof.

Another object is to provide apparatus and methods to provide secure transmission of data in a manner which obviates the need for a distinct encryption key for each successive transmission between the same two nodes, and which prevents undetectable fraudulent insertion of data.

Still another object is to provide a secure data transmission system which will prevent undetected deletion or modification of data.

Still another object is to provide a data transmission network enabling secure data communications through use of a data encryption standard, such as, for example, the Federally promulgated "Data Encryption Standard" (DES) set forth in Federal Information Processing Standards Publication (FIPS-PUB)-46 (1977).

A still further object is to provide a secure data transmission system employing a data encryption standard, e.g., the DES cryptographic system in a manner which prevents unauthorized disclosure or modification of keys or key word variables.

These and other objects, features and advantages will be made apparent by the following description of a preferred embodiment of the invention, the description being supplemented by drawings as follows:

BRIEF DESCRIPTION OF THE DRAWINGS

FIG. 3 is a table showing the format of a transmitted message (TM) data packet and a received message (RM) data packet utilized in a standard local area network data transmission system, e.g., "Ethernet."

FIG. 4 is a table showing the data fields employed in an association request (AR) data packet employed in the system of the invention.

FIG. 5 is a table showing the data fields of an association open (AO) data packet employed with the system of the invention.

FIG. 6 is a table showing the data fields of an association forward (AF) data packet employed in the system of the invention.

FIG. 7 is a table showing the data fields of an identifier exchange (IDX) data packet employed with the system of the invention.

FIG. 8 is a table showing the data fields of an encrypted message (EM) data packet employed with the system of the invention.

FIG. 10 is a table showing data fields of an initialization request (IR) data packet employed with the system of the invention.

FIG. 11 is a table showing data fields of an initialization data packet employed in the system of the invention.

FIG. 12 is a table showing data fields of a change status (CS) data packet employed in the system of the invention.

FIGS. 13A, 13B, 13C and 13D are functional flowchart illustrations showing the steps employed by the system of the invention to transfer a TM data packet and establish a secure connection between two nodes.

DETAILED DESCRIPTION OF THE EMBODIMENT

While the principles of the invention can be employed to provide secure data transmission through end-to-end encryption at the data link level in any data network utilizing discrete data packet handling, the system described hereinafter has been embodied for use in the "Ethernet" local area network system. The standard protocols and packet formats used in the "Ethernet" system are well known to those in the art. Reference is made to the following publications for a more detailed description of the applicable specifications and standards for "Ethernet" and for the "DES" encryption system which would be available to, and within the knowledge of those seeking to implement the system described herein. The following publications are incorporated herein by reference insofar as they include technical descriptions of such systems.

1. Ethernet, A Local Area Network, Data Link Layer and Physical Layer Specifications, Version 2.0.
2. FIPS-PUB-46, "Data Encryption Standard," Federal Information Processing Standards Publication, 1977.
3. FIPS-PUB-74, "Guidelines for implementing and Using the NBS data Encryption Standard," Federal Information Processing Standards Publication, 1981.
4. FIPS-PUB-81, "DES Modes of Operation," Federal Information Processing Standards Publication, 1980.
5. NBS (National Bureau of Standards) Special publication 500-20, "Validating the Correctness of Hardware Implementations of the NBS Data Encryption Standard," 1980.
6. NBS Special Publication 500-61, "Maintenance Testing for the Data Encryption Standard," 1980.
7. Proposed Federal Standard 1026: "Telecommunications: Interoperability and Security Requirements for Use of the Data Encryption Standard in the Physical and Data Link Layers of Data Communications," 1981.
8. Proposed Federal Standard 1027: "Telecommunications General Security Requirements for Equipment Using the Data Encryption Standard," 1982.
9. National Security Agency: "Procedures for Endorsement of Commercial Data Encryption Standard (DES) Equipment for U.S. Government Applications," 1982.
10. "Message Authentication with Manipulation Detection Codes," (Publ. - Date) R.R. Jueneman. S.M. Matyas and C.H. Meyer.
11. "American National Standard for Financial Institution Key Management," American National Standards Committee, X-9-Financial Services, Document N206, January 9, 1984 (ANSI X9.E.9).
12. "Proposed changes: X9.9-1982," Document N206, Jan. 10, 1984.
13. "American National Standard for Financial Institution Message Authentication," American National Standards Committee, X9-Financial Services, X9.E8 Working Group, Draft 12, July 13, 1981.
14. EG-22715-18, "Distributed Processinq and Networks Sales Guide," Digital Equipment Corporation, 1982.
15. Cryptography: A New Dimension in Computer Data Security, Meyer, C., and Matyas, S.; Wiley Interscience, 1982.
16. Cryptography: A Primer, Konheim, A.; John Wiley and Sons, 1982.
17. Cryptography and Data Security, Denning, D.; Addison-Wesley, 1982.

Figure 1:
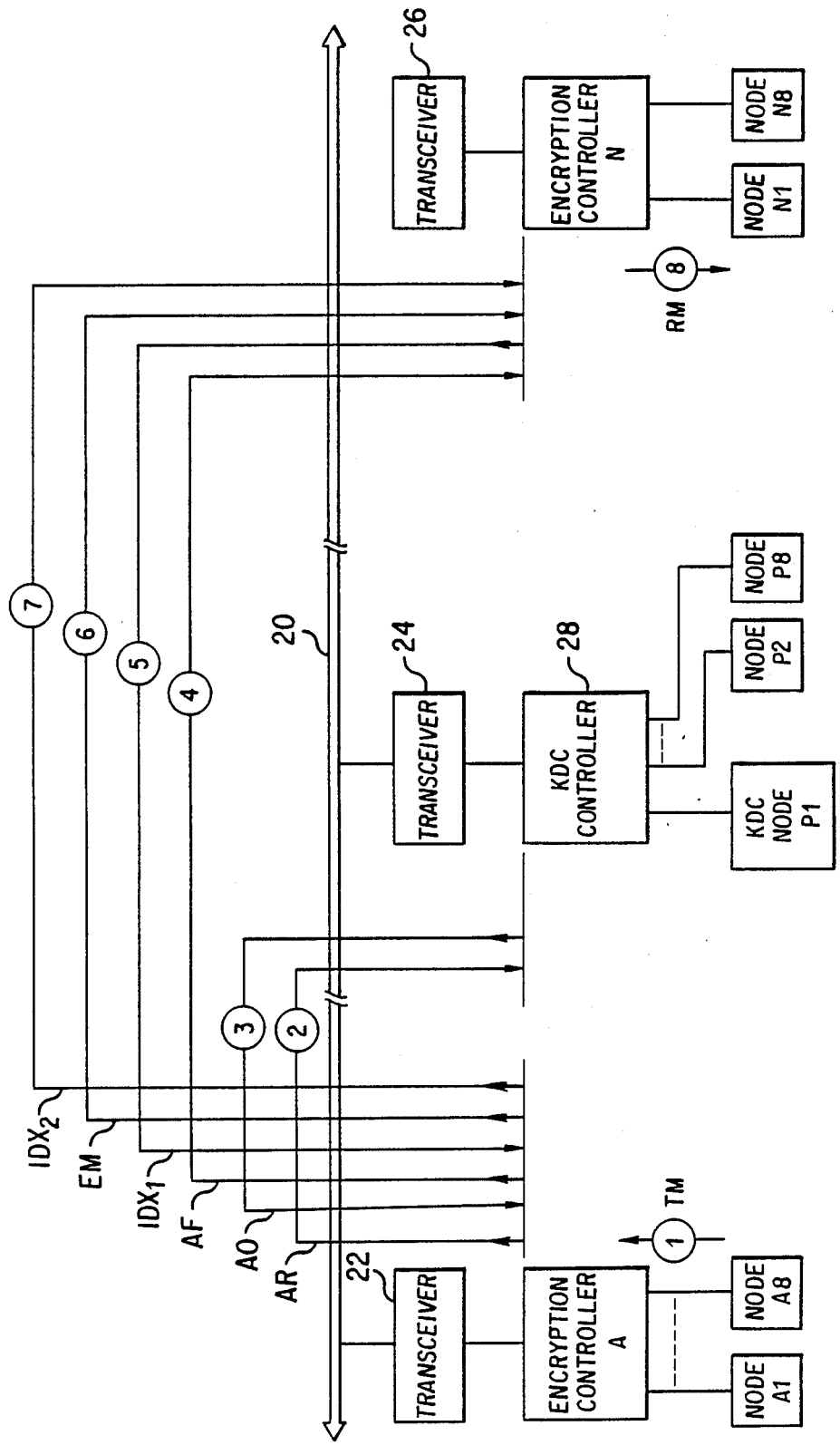
FIG. 1 is a schematic diagram illustrating the principal hardware units employed in a data transmission network having secure communication capabilities in accordance with the invention.

Referring to FIG. 1, a standard network coaxial cable 20 has coupled to it a variety of node devices A1–A8 through N1–N8. Node devices A1–A8 interface with cable 20 through a standard Ethernet transceiver 22 which may be, for example, a standard H4000 transceiver and an encryption controller A which is provided in accordance with the present invention. H4000 transceivers are available from Digital Equipment Corporation of Maynard, Mass. Node devices N1–N8 are interfaced to cable 20 by a transceiver 26, similar to transceiver 22, and encryption controller N identical to encryption controller A, described in detail hereinafter.

A special Key Distribution Center (KDC) encryption controller or KDC controller 28 is also coupled to cable 20 via a standard transceiver 24 and provides unique key distribution functions which enable the secure transmission of data from point to point within the network in accordance with the invention. A variety of node devices P1–P8 are coupled to KDC controller 28 in the same manner in which nodes A1–A8 and N1–N8 are coupled to encryption controllers A and N, respectively. Node P1 of nodes P1–P8 coupled to KDC controller 28 is a special purpose KDC node which enables KDC controller 28 to provide unique key distribution functions.

Figure 2:
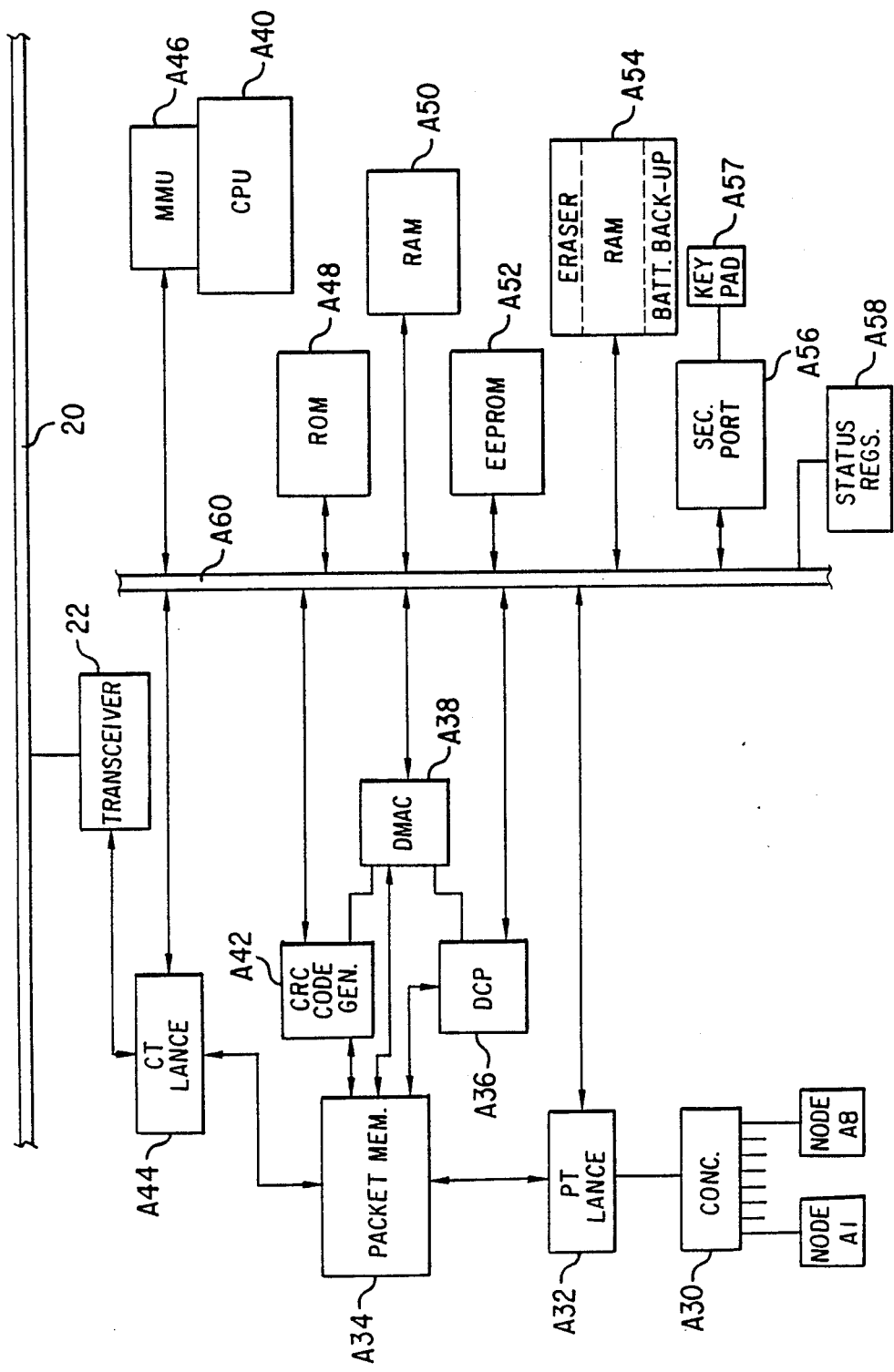
FIG. 2 is a schematic block diagram of an encryption/key distribution controller employed in the system of the invention.

FIG. 2 shows the hardware configuration of encryption controller A. As previously mentioned, encryption controller N and KDC controller 28 are configured similarly to controller A. As will be apparent from the description below, however, KDC controller 28 operates somewhat differently from controllers A and N inasmuch as the KDC controller 28 is used to perform centralized key distribution functions unique within the system. Although a plurality of identical KDC controllers may be employed in the network in order to increase the probability that a KDC controller will be available for use in securing the network, the system as described herein employs a single KDC controller.

Encryption controller A, shown in FIG. 2, employs two data handling paths, one path includes the components shown to the left of bus A60, which process data packets from node devices A1-A8 to the network cable 20 and from the network cable 20 to the node devices. Another path includes components, shown to the right of bus A60, which provide data control functions required for implementing the data encryption and decryption functions, as well as the other security functions of the system.

Standard Ethernet data packets (also referred to as "node frames") are channelled from the node devices A1-A8 through a concentrator A30 which feeds the data packets on demand to a plaintext (PT) LANCE controller (Local Area Network Controller for Ethernet) A32. PT LANCE A32 performs certain checks on an incoming data packet and assigns the packet to a designated storage location in a section of a packet memory A34.

As is explained in detail hereinafter, when it is desired to encrypt the message portion of a data packet received from one of the node devices A1-A8, the format and content of the data packet residing in packet memory A34 is transformed from the standard "Ethernet" format to a special encrypted message data packet format in accordance with the present invention. This is done by transferring the data packet from packet memory A34 to a Data Ciphering Processor DCP A36 which implements the encryption algorithm of the DES system. Transfer of the data packet from packet memory 34 to DCP A36 for encryption is done under control of a Direct Memory Access Controller (DMAC) A38. Subsequently, and also under the control of DMAC A38, the encrypted data is transferred from DCP A36 back to packet memory A34. DCP processor A36 performs the encryption function under the control of central processing unit (CPU) A40. CPU A40 also controls packet memory A34 and DMAC A38. An integrity check code generator, such as a cyclic redundancy check (CRC) code generator A42, is employed to calculate integrity check codes in parallel with the operation of DCP A36. The cyclic redundancy check codes are included with data packets. After encryption by DCP A36, an encrypted data packet stored in packet memory A34 is transmitted to the network cable 20 via ciphertext (CT) LANCE A44 and transceiver 22.

In accordance with the present invention, when it is desired to transfer a conventional plaintext data packet to the network in the clear, i.e., without encryption, the packet is transferred from PT LANCE A32 to CT LANCE A44 through packet memory A34 without the data packet being transferred to DCP A36 for encryption.

As will be seen from the following description, the present invention is primarily concerned with the transfer of encrypted data packets and with a system and method for encrypting/decrypting the data packets. However, transfer of unencrypted data packets between nodes can take place in situations in which a response to an "association request," made on behalf of a node, indicates that unsecured transmission of data is allowed. In such a situation, DCP A36 is bypassed as the data packets are transferred directly through packet memory A34.

In decrypting an encrypted data packet or node frame received from cable 20, DCP A36, DMAC A38 and DCP A42, operate in a manner which reverses the sequence of operations described above such that the received encrypted data packet is decrypted during transfer from CT LANCE A44 through packet memory A34 to PT LANCE A32. Decryption of an encrypted data packeted by DCP A36 is also performed under the control of CPU A40.

CPU A40 controls and supervises, through the execution of firmware, all of the data transfer functions of encryption controller A. CPU A40 operates in association with Memory Management Unit (MMU) A46, and in association with a series of memory units and other peripheral devices. These include a Read Only Memory (ROM) A48 for storing encryption/decryption firmware, a first Random Access Memory (RAM) A50 for storing association records, an Electronically Erasable Programmable Read Only Memory (EEPROM) A52 for storing firmware updates, and a second or secure Random Access Memory RAM A54. Power to RAM A54 is interrupted by CPU A40 to erase stored encryption keys whenever Encryption controller A is physically compromised, that is whenever controller A has been tampered with. Also, RAM A54 has battery backup capability for preserving encryption keys when unintended power interruptions have taken place. A security port A56 to which a manual key pad A57 is connected, and various control and status registers A58 also operate in association with CPU A40 and MMU A46.

The various hardware components shown in FIG. 2 comprise commercially available units whose operation is well known to those in the art. For example, LANCE units A32 and A44 may be "Am7990" local area network controllers available from Advanced Micro Devices, Inc. of Sunnyvale, Calif. DMAC unit A38 may be "Am9516" universal DMA controller produced by Advanced Micro Devices, Inc. The data ciphering processors A36 and A42 may be model "Amz806-8/Am9518" data ciphering processors also available from Advanced Micro Devices, Inc.

CPU A40 may be an MC68010 microprocessor produced by Motorola and the MMU A46 may be an MC68451 memory management unit from the same company. Packet memory A34 and the various ROM and RAM memories are conventional storage devices commercially available and designed for compatible operation with the devices with which they must interface.

Encryption controller N has the exact same hardware configuration as that shown in FIG. 2 and KDC controller 28 is likewise identical except that, as shown and described, in the present operating environment, controller 28 services a specialized KDC node P1 which is coupled to a concentrator such as the unit A30 shown in FIG. 2. Of course, as hereinafter described, the message processing and key distribution functions performed by KDC controller 28 are different from those functions performed by encryption controllers A and N.

While the system as configured in the present embodiment operates in the "Ethernet" environment using DES and employs specific hardware modules as noted above, it is understood that the apparatus and methods of the present invention may be embodied in different forms of network systems using different encryption algorithms and different hardware components.

BASIC OPERATION

Referring to FIGS. 1-8, the basic operation of the system will be described. In a typical "Ethernet" system without the security provided by the present invention, all data packets or node frames sent by any node will be available in unencrypted plaintext form at all other nodes. While a typical node device will normally receive and respond only to packets addressed to it and to multicast messages (packets addressed to a group of nodes), any node can be easily programmed to receive packets for any address, to send packets claiming to be any address, or to be in a "promiscuous" mode and receive all packets. Encryption controllers provided by the present invention reside between the data nodes and the network cable and apply essentially transparent security to the local area network by providing encryption/ decryption and authentication functions for all packets transmitted on the cable which are designated for secure handling.

A KDC controller and encryption controllers use several levels of encryption/decryption keys to assure secure transfer of data through the network. Such encryption/decryption keys are referred to herein as keys or, in the alternative, as key words. In the present system, a key encryption key (KEK) for a KDC controller is generated external to the system and manually installed in the KDC controller by trusted personnel using a key pad. A unique key generation key (KGK) and a unique key generation seed (KGS) are also generated external to the system and manually installed in the KDC controller by trusted personnel. The KGK and KGS for the KDC controller, which are encrypted using the KEK and then transferred to the KDC node, are used by the KDC node of the KDC controller to generate an initialization key (IK) for each encryption controller. An IK for an encryption controller is used to initialize the encryption controller. An encryption controller is initialized when the encryption controller and a KDC controller are made aware that the KDC controller will provide support for the encryption controller, i.e., will provide a secure link through the system between the encryption controller and another encryption controller which is also initialized and supported by the KDC controller.

Each IK which has been generated by a KDC controller is printed out through the specialized KDC node and manually installed in an encryption controller to be supported by the KDC controller to which the KDC node P1 is connected. Thereafter, various initialization messages are exchanged between encryption controllers and a KDC controller. The initialization messages for each encryption controller are encrypted with the IK for that encryption controller. The initialization messages make encryption controllers and a KDC controller aware of (and establish) the support relationship which is to exist between the encryption controllers and the KDC controller. The IK is discarded, that is, not used again after the encryption controller to be supported by the KDC controller has been initialized.

Initialization messages sent from a KDC controller to encryption controllers supported by that KDC controller include a unique master key and a unique service key for the encryption controllers. Unique master and service keys for each encryption controller are also generated by the KDC node of the KDC controller. The KGK and KGS are also used to generate the encryption controller master and service keys. Master and service keys for the encryption controllers are stored in encrypted form in the KDC node coupled to the KDC controller. The service and master keys are encrypted under the KDC controller key encryption key, KEK, for storage.

Master keys for the encryption controllers are used only for the encryption/decryption of other keys and information transferred between an encryption controller and other encryption controllers or a KDC controller in the process of establishing a secure link between nodes. Master keys are not used for encryption/decryption of standard node frames transferred between nodes. This limited use of any master key limits the exposure of that master key and enhances the overall security of the network. Standard node frames when transferred between nodes, are encrypted using association keys. A unique association key is generated by the KDC node for each encrypted node frame for transfer between a pair of nodes. The steps by which association keys are transferred to encryption controllers for use in encrypting node frames are described in detail hereinafter.

The specific steps involved in the initialization of encryption controllers outlined above are also described in detail hereinafter.

After two encryption controllers, each having one of a pair of nodes between which a node frame or standard data packet is to be transferred, have been initialized, a secure connection between the pair of nodes is established. The following sequence of events establishes a secure connection between a unique pair of data nodes operating in the system. With the exception of some delay, the establishment and operation of the connection is transparent to the data nodes involved. That is, the operation of the system is otherwise unaffected by the establishment of a secure connection.

Referring to FIG. 1, data node A8 (the source node) wishes to communicate with data node N1 (the destination node). Data node A8 sends a standard "Ethernet" node frame or transmitted message (TM) data packet addressed to data node N1. FIG. 3 shows the format of the TM data packet.

The first of five data fields which constitute the TM data packet is a six-byte code designating the destination node, node N1, to which the TM packet is to be transferred. Field 2 is another six-byte field. Field 2 designates the source node, node A8. Field 3 is a two-byte field for specifying a protocol type for the TM data packet. Fields 4 and 5 contain a 46-1464 byte message and a four-byte integrity check as, for example a cyclic redundancy check (CRC) code, respectively. As indicated in the ENC (encryption) STATUS column, all fields of the TM data packet are "clear" (C), i.e., unencrypted.

In step 1 of the process for establishing the secure connection (indicated by the arrow bearing the circled 1 in FIG. 1), the TM data packet is transmitted from node A8 to encryption controller A, where it is stored in packet memory A34 after processing by PT LANCE A32 (FIG. 2). Encryption controller A, under the direction of CPU A40, searches a stored association table (stored in RAM A50) to determine whether a currently valid association exists between node A8 coupled to encryption controller A and node N1 coupled to encryption controller N. It is assumed for purposes of this exemplary discussion that a valid association does not exist for nodes A8 and N1. The TM data packet is retained in packet memory A34 and the controller, operating under control of CPU A40 and firmware stored in ROM A48, formulates and transmits to network cable 20 an unencrypted association request (AR) message or data packet in order to request the establishment of a valid association between nodes A8 and N1. The AR data packet is transferred in step No. 2 shown in FIG. 1.

The format of the AR data packet is shown in FIG. 4. The first data field of the packet contains a two-byte designation of the message type. That is, field 1 specifies that the message is an AR message. Data fields 2 and 3 are, respectively, a two-byte encryption identifier and a four-byte sequence number. The purpose of the information contained in these fields is described in detail, hereinafter. Field 4 is a two-byte copy of the message type appearing in the first field. The fifth data field of the packet contains a six-byte source address, in this case, the "Ethernet" address of node A8. Field 6 contains the destination address, which in this case is the address of the destination data node N1. Field 6 is also six bytes in length. Field 7 contains a designation of the time remaining in an association existing between the source node specified in field 6 and the destination node specified in field 5. Where, as in the case presently described, no association yet exists between the source and destination, the time field value is zero.

KDC controller 28 receives the AR data packet and, operating under control of its CPU and firmware, forwards the AR data packet to KDC node P1 which checks a network configuration table contained at the node to determine what, if any, communication is permitted between the nodes.

As stated above, KDC controller 28 is essentially equivalent to encryption controller A and encryption controller N. Accordingly, hereinafter the hardware devices for encryption controller A, with corresponding reference numerals as shown in FIG. 2, will be used to describe the operation of encryption controllers A and N, and KDC controller 28.

If KDC node P1 indicates that transmission of the type requested by encryption controller A is authorized, KDC controller 28 formulates an association open (AO) data packet and transmits the AO data packet to encryption controller A in the third step of the process illustrated in FIG. 1. AO data packets contain information which indicates to encryption controller A that communication between nodes A8 and N1 is authorized by the system security policies as implemented in KDC node P1. As described in detail hereinafter, AO data packets are of several types. The type of AO packet transmitted in any particular situation depends on the nature of the connection between network cable 20 and a node to which, or from which, a node frame is to be transferred.

The format and contents of the AO data packet are shown in FIG. 5. Field 1 contains a two-byte designation of the message type An encryption identifier specifying the encryption parameter or key used to encrypt the AO message is contained in the two bytes of field 2. Fields 1 and 2 containing message type and the encryption key identifier are referred to as the "header" of the packet. (Please note that the terms "messages" and "packets" are used interchangeably.) AR and AO packets as well as several other messages described below contain message headers. Message headers are not encrypted for transfer so that the type of message and the key used to encrypt the message can be determined by the controller receiving the message. Field 3 is a four-byte sequence number (also used to verify the integrity or authenticity of messages). The message type appearing in field 1 is copied in the two bytes of field 4. Fields 5, 6 and 7 are each six-bytes and specify, respectively, the address of the supporting KDC node (KDC node P1), the address of the source node (node A8), and the address of the destination node (node N1).

Field 8 is a two-byte field of association flags for use in specifying, for example, whether association traffic (i.e., the number and types of messages transferred between the source and destination nodes) is to be audited. Field 9 is a twenty-byte field containing the association encryption parameter, that is, the key which is used to encrypt node frames which are transferred between node A8 and N1 after the secure connection between the nodes is established. Field 10 comprises 2 bytes describing the type of integrity check to be used for encrypted node frames. Field 11 provides an amount of padding necessary to bring the length of the AO message to a multiple of a predetermined encryption block length. Field 12 contains an association forward (AF) data packet. The AF message contained in the twelfth field of the AO message is transferred from controller A to controller N in the fourth step of the process illustrated in FIG. 1. The AF message contains association information, such as the association parameter or key, which is used to encrypt node frames transferred between nodes A8 and N1. A two-byte integrity check value, which in this example comprises a CRC code, is contained in the last field, field 13 of the AO message.

As described above, prior to any transfer of messages between encryption controllers and a supporting KDC controller, the encryption controllers are initialized by the KDC controller. Initialization includes generation, by the supporting KDC controller, of a unique master keY for each encryption controller and transfer of the master key to the encryption controller in an initialization message.

Encryption controller master keys are used in the transfer of AO messages. The key for encryption controller N (MKN) is used to first encrypt the AF message portion (field 12) of the AO message. Thereafter, the master key for encryption controller A (MKA) is used by KDC controller 28 to encrypt the entire AO message. Since KDC node P1 stores encryption controller master keys (in KEK-encrypted form), KDC controller 28, by accessing the master keys from KDC node P1, is able to perform the encryption. Encryption controller A receives its master key during initialization, and stores the key in RAM A50. Thus, encryption controller A is able to decrypt the AO message when that message is received.

In the fourth step shown in FIG. 1, the AF message in Field 12 of the AO message is transferred, in MKN-encrypted form over network cable 20 from encryption controller A to encryption controller N. The contents and format of the AF data packet are shown in FIG. 6. The first two fields of the AF data packet are a header containing the message type and the encryption identifier for the message. Field 3 contains a four-byte sequence number and field 4 copies the message type. Fields 5, 6 and 7 are, again, each 6 bytes and specify, respectively, the address of the supporting KDC node, the address of the source node, and the address of the destination node. Field 8 is a two-byte field containing association flags. The association encryption parameter or key is contained in field 9 which is 20 bytes in length. Field 10 contains a 2-byte designation of the integrity check code type. Field 11 is a padding field and Field 12 contains a CRC code value.

When encryption controller N receives the AF data packet, controller N decrypts the packet using its own master key, $MK_N$. Subsequently, controller N stores information as to its association with controller A in an association table. The association table is stored in the portion of controller N equivaient to RAM A50 of controller A.

After receipt of the AF data packet by encryption controller N, the association between controllers A and N necessary to allow communication between nodes A8 and N1 is established but not confirmed Decryption of the encrypted TM data packet transferred from node A8 to node N1 is not performed by encryption controller N until the association between the controllers for the nodes is both established and confirmed.

To confirm the association, a pair of identifier exchange (IDX) messages, $IDX_1$ and $IDX_2$, is exchanged between controllers A and N in steps 5 and 7 as shown in FIG. 1. The IDX messages are exchanged in encrypted form. Specifically, the association encryption parameter or key (AK) transferred to controller A in field 9 of the AO message and transferred to controller N in field 9 of the AF message is used to encrypt the IDX messages.

The two IDX messages exchanged between controllers N and A are of the same form and are illustrated in FIG. 7. The first 2 fields comprise a header having a two-byte message type and a two-byte encryption identifier. Field 3 contains a sequence number. Field 4 copies the message type. A storage location in RAM A50 for the AK used to encrypt an IDX message is identified in the two bytes of field 5. Field 6 is a padding field and field 7 contains an integrity check code value.

After controller N sends a first IDX message, $IDX_1$, to controller A over network cable 20, controller A, in anticipation of a confirmed association, forwards the initial TM data packet to controller N in encrypted form. This is shown as step 6 in FIG. 1. Controller A then evaluates the $IDX_1$ message received from controller N to determine whether controllers A and N agree on the association key and association table information for use transferring node frames.

If controller A determines that agreement exists with controller N, then controller A formulates a second IDX message, $IDX_2$, which is transferred to and evaluated by controller N. After controller N determines that agreement exists with controller A as to the association, the association is deemed established and confirmed, and controller N proceeds with the decryption of the encrypted TM data pack (EM) already forwarded by controller A.

The contents and format of the EM data packet are shown in FIG. 8. The first two fields of the EM data packet constitute a header designating the message type and identifying the association encryption parameter under which the EM data packet is encrypted. Field 3 is a ten-byte field containing an original header appearing with the unencrypted TM or node frame data. Field 4 is a sequence number and field 5 is a copy of the message type. The body of the TM message transferred is contained in field 6, and the message is appropriately padded by field 7. Field 8 contains an integrity check or CRC code value.

The final step of the system operation depicted in step 8 of FIG. 1 is effected when encryption controller N converts the EM data packet into the format of a received message (RM) data packet, which is a duplicate of the original TM data packet illustrated in FIG. 3. This is done by decrypting fields 3-7 of the EMP packet and then transmitting to node N1 a packet consisting of field 6 of the EM data packet together with the source and destination addresses and an integrity check code calculated based on those transferred data fields. The resulting five fields are identical to the TM data packet if the transfer has been effected without error.

When encryption controller A receives a further TM data packet from node A8 destined for node N1, the search for an association key which is conducted by encryption unit A will locate a valid association key for node N1. In this case, secure data transmission according to the invention takes place following only steps 1, 6 and 8 shown in FIG. 1, steps 2-5 and 7 being unnecessary due to the existence of an established valid association between the source and destination nodes.

Similarly, if encryption controller N receives a TM data packet from node N1 destined for node A8, the identical three step data transfer process 1, 6 and 8 will ensue since the secure RAM A50 of controller N stores in its own association table the N1-A8 association key which was received in the AF data packet. Thus, step 1 will transfer a TM data packet from node N1 to encryption controller N, step 6 will thereafter be executed to transfer the EM data packet from encryption controller N to encryption controller A, and step 8 will thereafter transfer the decrypted standard RM data packet from encryption controller A to node A8.

As described in detail hereinafter, the firmware of each controller operates to periodically disable association key variables and render them unusable for encrypting/decrypting messages, thus enhancing system security.

DETAILED DESCRIPTION OF OPERATION AND CONTROL FIRMWARE

Initialization

Figure 9A:
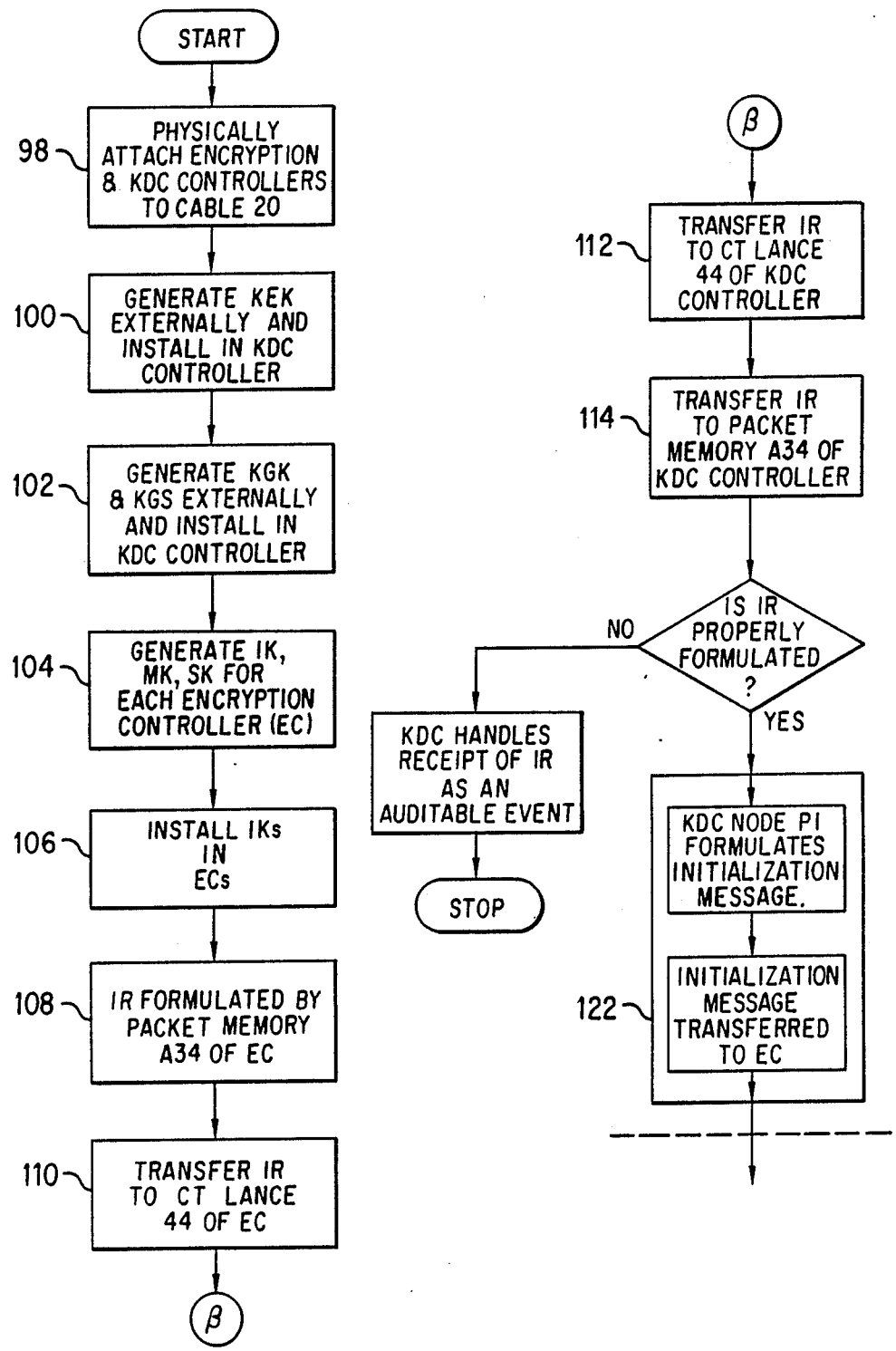
FIGS. 9A and 9B are functional flowchart illustrations showing the steps employed by the system of the invention to initialize encryption controllers and a KDC controller.
Figure 9B:
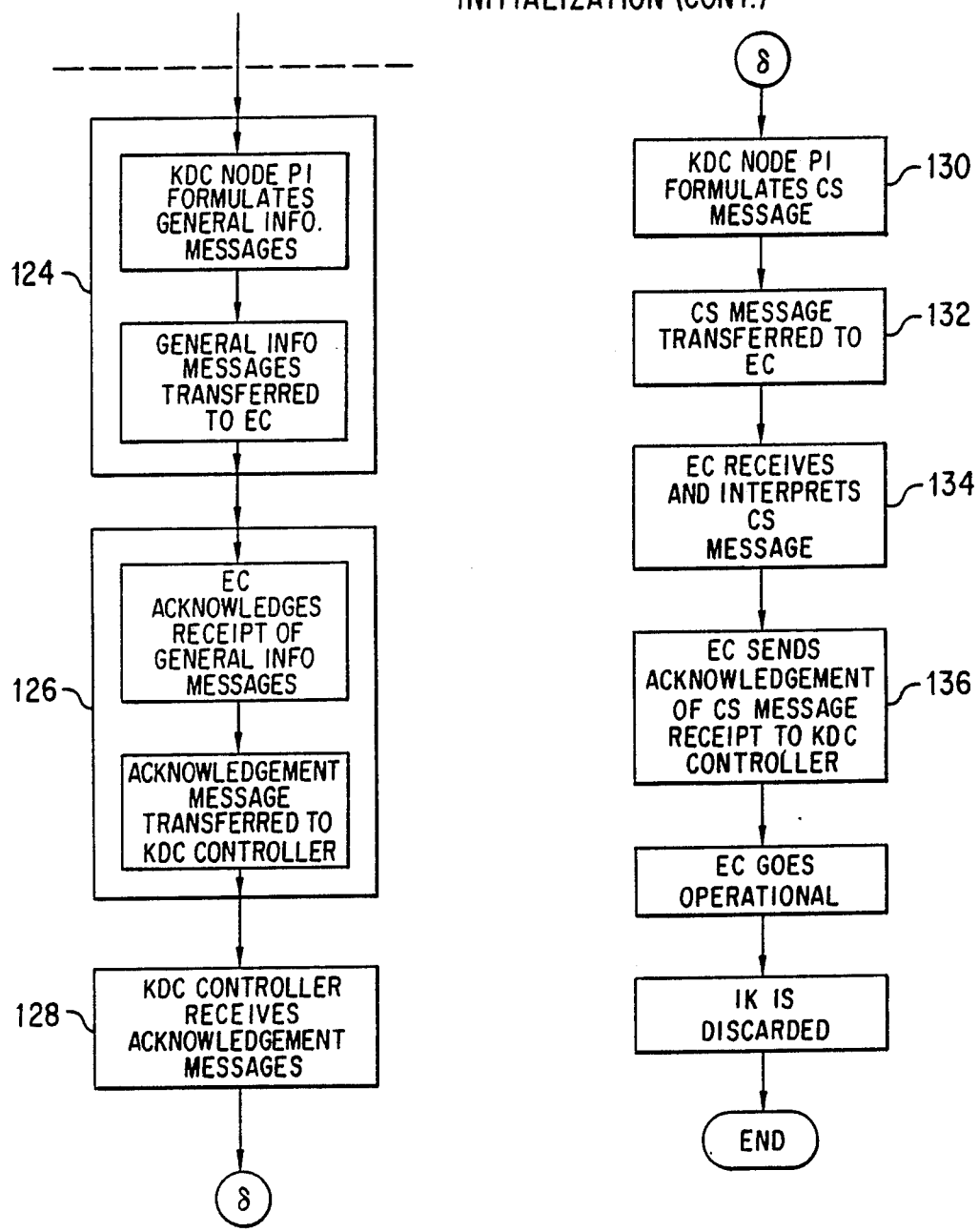

Referring to FIGS. 1 and 2 and the functional flowchart of FIGS. 9A and 9B, initialization of encryption controllers A and N and KDC controller 28 is described. Initialization of encryption controller A, encryption controller N and KDC controller 28 is performed after encryption controller A, encryption controller N and KDC controller 28 have been physically attached to network cable 20 through transceivers 22, 26, and 24, respectively, as shown in step 98 of FIG. 9A. Thereafter, in a step 100, key encryption key (KEK) for KDC controller 28 is generated external to the system and manually installed in KDC controller 28 by trusted personnel. The KEK is installed using a key pad A57 to which entrance is obtained by using a mechanical key.

In a following step 102, a unique key generation key (KGK) and a unique key generation seed (KGS) are also generated external to the system and then manually installed by trusted personnel. The KGK and the KGS are used by KDC controller 28 to generate a master key (MK), service key (SK) and an initialization key (IK) for each encryption controller at the request of KDC node P1 (step 104). As stated above, the IK generated for each encryption controller by KDC node P1 is used to initialize encryption controllers for which a secure link through the system is provided by KDC controller 28.

After the IK for each encryption controller has been generated, the generated initialization key for each controller is installed or entered into that encryption controller in step 106. The IKs are manually entered into an encryption controller using key pad A57. Manual key pad A57 does not have a visual display, and may be accessed only by using a mechanical key.

At the time IK is installed, the hardware address of the KDC node P1 coupled to KDC controller 28 through concentrator A30 is also installed manually in the encryption controllers. The KDC node address, which is six-bytes in length, is also installed using the manual key pad A57 coupled to security port A56 of the encryption controller being initialized. The KDC node address indicates that a secure connection through the system for the encryption controller will be provided by the KDC controller node specified by the given address. Thereafter, the node address is used by the encryption controller to direct information to KDC node P1 during initialization and subsequent establishment of a secure connection between nodes A8 and N1, the node address being included in messages transferred during initialization and establishment of the secure connection.

In a subsequent step 108, each encryption controller to be initialized formulates an initialization request (IR) message to be transferred to KDC controller 28. An IR message for an encryption controller is formulated in packet memory A34 of that encryption controller.

The contents and format of an IR message are as shown in FIG. 10. The IR message is a five field message. The first field of the IR message is a two-byte field indicating the type of message, namely, an IR message. Field 2 is a two-byte field for indicating the encryption parameter for the message. IR messages are unencrypted and, therefore, the encryption parameter field does not specify an encryption parameter or encryption key. Field 3 is a four-byte field for a sequence number. Field 4 is a two-byte field which copies the message type. Field 5 is a four-byte field containing a hardware version number for the encryption controller transferring the IR message.

Subsequently, in a step 110, the IR message is transferred under control of CPU A40 of the encryption controller to CT LANCE A44. A buffer of CT LANCE A44 holds the IR message until the message can be transferred through transceiver 22 over network cable 20 to KDC controller 28. When traffic over network cable 20 permits, the IR message is transferred to KDC controller 28 and is received by CT LANCE A20 of KDC controller 28 via transceiver 24 of KDC controller 28 (step 112). The buffer of CT LANCE A44 of the encryption controller sending the IR is cleared after the IR message is transferred to KDC controller 28.

In a subsequent step 114, the IR message is transferred from CT LANCE A44 to packet memory A34 of KDC controller 28. CPU A40 then evaluates the IR stored in packet memory A34 to determine whether the IR message has been properly formulated (step 116). As is described in detail hereinafter in connection with messages transferred during establishment of the secure connection between nodes, a variety of checks are performed on messages transferred through the system, to determine whether the messages are properly formulated, whether the messages have been correctly transferred, and whether the messages are authentic. If the IR message has not been properly formulated, CPU A40 deems the transfer of the IR message from the source encryption controller to KDC controller 18 an "auditable event". (See step 118.) The treatment of auditable events is briefly described hereinafter. If the IR message has been properly formulated, the IR message is transferred from packet memory A34 to PT LANCE A32 of KDC controller 28, and thereafter to KDC node P1 coupled to concentrator A30 of KDC controller 28 (step 120). The IR message transferred to PT LANCE A34 is stored in a buffer of PT LANCE A32 until the IR message can be transferred through concentrater A30 to KDC node P1.

KDC node P1 which, as stated above, implements the security policies of the system, subsequently processes the IR message from the encryption controller being initialized and generates the information necessary to accomplish initialization of the encryption controller.

The information necessary to complete the initialization of the encryption controller is formatted in data packets by KDC node P1 and transferred through KDC controller 28 to the encryption controller. Three types of data packets are used to transfer the necessary information. The first of the messages formulated by KDC node P1 and transferred to the encryption controllers is an initialization message (step 122).

The initialization message, as shown in FIG. 11, is a twelve field message. The first field of the message is a two-byte field containing the message type, that is, an indication that the message is an initialization message. The second field is a two-byte field indicating the encryption parameter or key used to encrypt the message. Initialization messages are encrypted with the IK Encryption of the initialization message is performed by DCP A36 of KDC controller 28 after the initialization message is transferred from KDC node P1 to KDC controller 28. DCP A36 obtains the IK for encrypting the initialization message from KDC node P1. The initialization message is then transferred over cable network 20 to an encryption controller. Field 3 is a four-byte field which contains a sequence number. Field 4 is a two-byte field with a copy of the message type. Field 5 is a six-byte field containing the address of KDC controller 28, and field 7 is a four-byte field containing the address of the encryption controller. The master encryption parameter or master key for the encryption controller being initialized is contained in the twelve-byte field comprising field 7. This master key was generated by KDC node P1 when the IK for the encryption controller was generated (step 104), and is used by the encryption controller to encrypt messages transferred between the encryption controller and KDC controller 28 during establishment of the secure connection between nodes.

A master integrity check code type is contained in the two-byte of field 8. The service encryption parameter or service key (SK) previously generated by KDC node P1 for the encryption controller being initialized is contained in field 9 which is a twelve-byte field. The use made of service keys is described hereinafter. A service integrity check code type follows in field 10 which is a two-byte field. Padding to ensure that the initialization message is a multiple of the encryption block length is contained in field 11. An integrity check parameter or CRC code value is contained in the two-bytes comprising field 12.

Additional information for completing the initialization of an encryption controller is contained in messages such as, for example, general information messages which are transferred from KDC node P1 to an encryption controller being initialized in a step 124. The first four fields of general information messages contain message type information, the encryption ID for the messages, a sequence number and a copy of the message type. The last two fields of general information messages contain a padding field for ensuring that the messages are a multiple of the encryption block length, and a field containing an integrity check value. Also contained in general information messages is information specifying the duration of each association established by KDC controller 28 for the encryption controller being initialized. Acknowledgement of an initialization message and information messages received by an encryption controller being initialized is sent by the encryption controller to KDC node P1 over network cable 20 in a step 126 after the initialization message and the information messages have been received by the encryption controller. General information messages and acknowledgement messages are encrypted using the MK for the encryption controller.

The initialization message and information messages sent from KDC node P1 through KDC controller 28 to the encryption controller being initialized follow a path which reverses the path taken by the !R message transferred from the encryption controller to KDC controller 28. Specifically, the initialization message and information messages are transferred from KDC node P1 through concentrator A30 to PT LANCE A32 of KDC controller 28. Thereafter, the messages are transferred from PT LANCE A32 to packet memory A34. Under control of CPU A40, the messages contained in packet memory A34 are then encrypted by DCP A36. The integrity check values for the messages are generated by DCP A42 and appended to the messages Subsequently, the messages are transferred from packet memory A34 to CT LANCE A44. CT LANCE A44 transfers the message to the encryption controller to be initialized over network cable 20 through transceiver 24. The acknowledgement messages sent by the encryption controllers follow a similar path through the encryption controllers en route to KDC controller 28, but do not originate at a node. Rather, the acknowledgement messages originate in an encryption controller, and are transferred from packet memory A34 of the encryption controller through CT LANCE A44 and transceiver 22, and over network cable 20 to KDC controller 28.

In an initialization step 128, the acknowledgement messages from the encryption controller are transferred from KDC controller 28 to KDC node P1. The path for the acknowledgement message from KDC controller 28 to KDC node P1 is as described in connection with the initialization request, IR, message. In response to receipt of the acknowledgement message, KDC node P1 generates a change state (CS) message or data packet (step 130). The CS message is sent from KDC node P1 to an encryption controller in step 132. The CS message directs the encryption controller receiving the CS message to change its state from a state of being "uninitialized" to a state of being "initialized" or "operational". The contents and format of the CS message are as shown in FIG. 12.

The first two fields of the CS message are a two-byte message type field and a two-byte encryption identifier field, that is, the message header. The encryption identifier identifies the encryption parameter used to encrypt the CS message, namely, the master key for the encryption controller being initialized. A sequence number is contained in the four-bytes of field 3, and in field 4, which is two-bytes in length, the message type is copied. Whenever a CS message, or any of the other messages previously described as having the message type specified in the first and fourth fields, is received by the packet memory A34 of an encryption or KDC controller, the encryption controller or KDC controller receiving the message checks to see whether the message type appearing in the first field of the message agrees with the messaqe type appearing in the fourth field of the message. The message is rejected if the message type appearing in the first field and the copy of the message type appearing in the fourth field do not agree. Where this check is not shown in FIGS. 9A or 9B (or for FIGS. 13A–D described hereinafter) for messages received by packet memory A34, the performance of this check by CPU A40 is nonetheless assumed. Field 5 contains the address of the KDC controller sending the general information message. The state, such as, for example, the initialization state which the encryption controller is being directed to enter by the CS message, is specified in field 6 of the CS message. Field 7 is a padding field and field 8 contains an integrity check value In response to receipt of a CS message (step 134), an encryption controller, in a step 136, forwards a message acknowledging receipt of the CS message to the KDC controller. Thereafter, the encryption controller becomes operational, that is, initialized to attempt to transfer messages between itself and another encryption controller with the aid of the KDC controller and the KDC node (step 138). The above-described initialization process takes place between KDC controller 28 and each of encryption controllers A and N, for which KDC controller 28 will provide support.

The IK which is used to encrypt the initialization message, and the message acknowledging receipt of the initialization message is no longer used by the encryption controllers and supporting KDC controller after the encryption controllers become operational. (See step 140.) The use of other keys for subsequent communication between encryption controllers further secures transmission of data over unsecured network cable 20 of the system. As stated above, DCP A36 of the encryption controllers, or of KDC controller 28, encrypts and also decrypts messages or data packets DCP A36 encrypts and decrypts messages using keys stored in RAM A52, the battery backup memory or keys transferred to DCP A36 from KDC node P1. DCP A36 includes key registers for storing keys to be used to decrypt data packets.

Once a pair of encryption controllers such as encryption controller A and N having nodes A8 and N1, respectively have been initialized with KDC controller 28, a secure connection between nodes A8 and N1 may be established. The sequence of events establishing a secure connection between nodes A8 and N1 are described in detail below.

Transfer of TM Data Packet and Establishment of Secure Connection

After encryption controllers A and N are operational, a secure connection between nodes A8 and N1 may be established. The steps by which a secure connection between A8 and N1 are established are set forth in detail below. The steps set forth below also intended to further clarify certain common aspects of the transfer of messages as also performed in connection with the initialization process described above.

The secure connection between the nodes is established as a standard TM data packet is transferred from encryption controller A to encryption controller N. The establishment of the secure connection as the TM data packet is transferred does not effect the transfer of the TM data packet in any way apparent at node A8 except that there is possibly a slight introduction of a time delay as a result of the establishment of the secure connection. That is, as stated above, the establishment of the secure connection is, for the most part, transparent.

As shown in FIG. 13A, establishment of a secure connection between nodes A8 and N1 begins with the transfer of a TM data packet addressed to node N1 (see field 1 of the TM data packet, FIG. 3). In a step 200, the TM data packet is transferred from node A8 to packet memory A32 of encryption controller A. The TM data packet is transferred to PT LANCE A32 through concentrator A30 to which node A8 is coupled, and from PT LANCE A32 which is disposed between concentrator A30 and packet memory A34 to packet memory A34 As described above, an address for the source node for the TM data packet is included in the TM data packet. While the TM data packet is in PT LANCE A32 of encryption controller A, PT LANCE A32 processes the TM data packet to verify that the TM data packet was actually sent from the source node indicated in the TM data packet (step 202).

It should be noted that the steps set forth below describe aspects of the establishment of the secure connection with varying levels of detail. Aspects already described in detail in connection with the initialization process or in connection with establishment of the secure connection are broadly described afterward.

If the TM data packet did not originate at the source node indicated in the TM data packet, encryption controller A records receipt of the TM data packet as an auditable event (step 204). Auditable events are included in records of all security relevant events which are maintained by the KDC node. When an auditable event occurs as, for example, when a node frame is sent from one node claiming to be another node, a record of the nature of the event and the time of its occurrence is generated and transferred by the encryption through the KDC controller to the KDC node. Such records may be used by security personnel to determine what and how many attempts have been made to by-pass the security features of the system.

Assuming that the TM data packet originated at the source node as indicated in the data packet, CpU A40 determines, in a step 206, whether there is an already-existing valid association between source node A8 and destination node N1. As stated, the address of destination node N1 is also contained in the TM data packet. A record of valid associations for node pairs is, as described above, stored in RAM A50 of encryption controller A. It is assumed in describing the steps involved in the transfer of a TM data packet and the establishment of a secure connection between node A8 and node N1 that a valid association does not exist between nodes A8 and N1. Accordingly, each of the steps involved in transmitting a TM data packet and establishing a secure connection between two nodes, for which a valid association has expired or has not been established, is described below. To clarify, once a valid association is established it remains valid for a period of time. The period of time for which an association remains valid is typically 28 hours, but may be some other time. It is necessary to perform each of the steps involved in the transfer of the TM data packet and the establishment of the secure connection only if the association between the source node, node A8, and the destination node, node N1, is not presently valid.

In a subsequent step 210, after the TM data packet has been stored in packet memory A32, encryption controller A under the control of CPU A44 builds an association request (AR) message in packet memory A32. The contents of the AR message are as described above and illustrated in FIG. 4.

Also, as shown in FIG. 4, the AR message is unencrypted. Overall security of the system is not diminished by transfer of unencrypted AR messages. AR messages contain no substantive information (as is contained in TM data packets or node frames) but contain only information indicating that a node, e.g., node A8 of controller A wishes a secure link to another node, e.g., node N1 of encryption controller N. Field 9 of the AR message indicates the time remaining in a valid association between node A8 and node N1. Typically, the AR message will be sent after a previously existing association between nodes A8 and N1 has expired (no time remaining for association). Alternatively, an AR message may be sent by encryption controller A wishing to extend the time period over which the association between the source node and the destination node will be valid. In such a case, the information in field 9 will indicate that the association has not yet expired.

After the AR message has been built in packet memory A32 of encryption controller A, the AR message is transferred on behalf of node A8 (as indicated by field 5 of the AR message) under control of CPU A40 to CT LANCE A44 (step 212). The AR message is stored in a buffer of CT LANCE A44 until it can be transferred through transceiver 22 over network cable 20 to KDC controller 28 (steps 214–216). Step 215 is typical of the wait undergone by any message awaiting transfer over network cable 20. The buffer of CT LANCE A44 containing the AR message is cleared after the AR message is transferred over network cable 20 to KDC controller 28. Thereafter, encryption controller A awaits a message (association open or association rejection message) from KDC controller 28 indicating that the AR message from encryption controller A has been received and acted upon (step 218).

The AR message from encryption controller A is received by KDC controller 28 through transceiver 24. The AR message is transferred through transceiver 24 of KDC controller 28 to CT LANCE A44 of KDC controller 28 (step 220). In a subsequent step 222, CPU A40 of KDC controller 28 evaluates field 5 of the AR message containing a KDC node address to determine whether the AR message is intended for node P1 coupled to KDC controller 28 (i e., whether support for the node designated in field 5 of the AR message is provided by KDC controller 28). If the AR message is not intended for node P1, the AR message is rejected by CPU A40 and the buffer of CT LANCE containing the AR message is cleared (step 224). If on the other hand, the AR message is intended for node P1, the AR message is transferred under control of CPU A40 to packet memory A34 of KDC controller 28 (step 226).

In a step 227, CPU A40 performs various checks on the AR message to check the integrity and authenticity of the message. The sequence number and message type copy of the message are checked to determine if the message was fraudulently sent. In certain instances, fraudulent transmission is indicated if the message is out of sequence. Fraudulent transmission is also indicated if the message contains non-matching type fields. Fraudulent transmission is another example of an auditable event. Thereafter in a subsequent step 228, a properly transferred AR message is forwarded from packet memory A34 to KDC node P1. As with all messages transferred from packet memory A32 to KDC controller P1, the AR message is first transferred to PT LANCE A32 of KDC controller 28, and then transferred in sequence by concentrator A30 from a buffer of PT LANCE A32 to KDC node P1. The node of nodes P1–P8 for which the AR data packet is intended must be specified to concentrator A30 to ensure that the data packet is properly transferred by concentrator A30 to the proper node, KDC node P1. After the AR message has been transferred to the KDC node P1, the buffer of PT LANCE A32 used to hold the AR message is cleared.

Figure 13B:
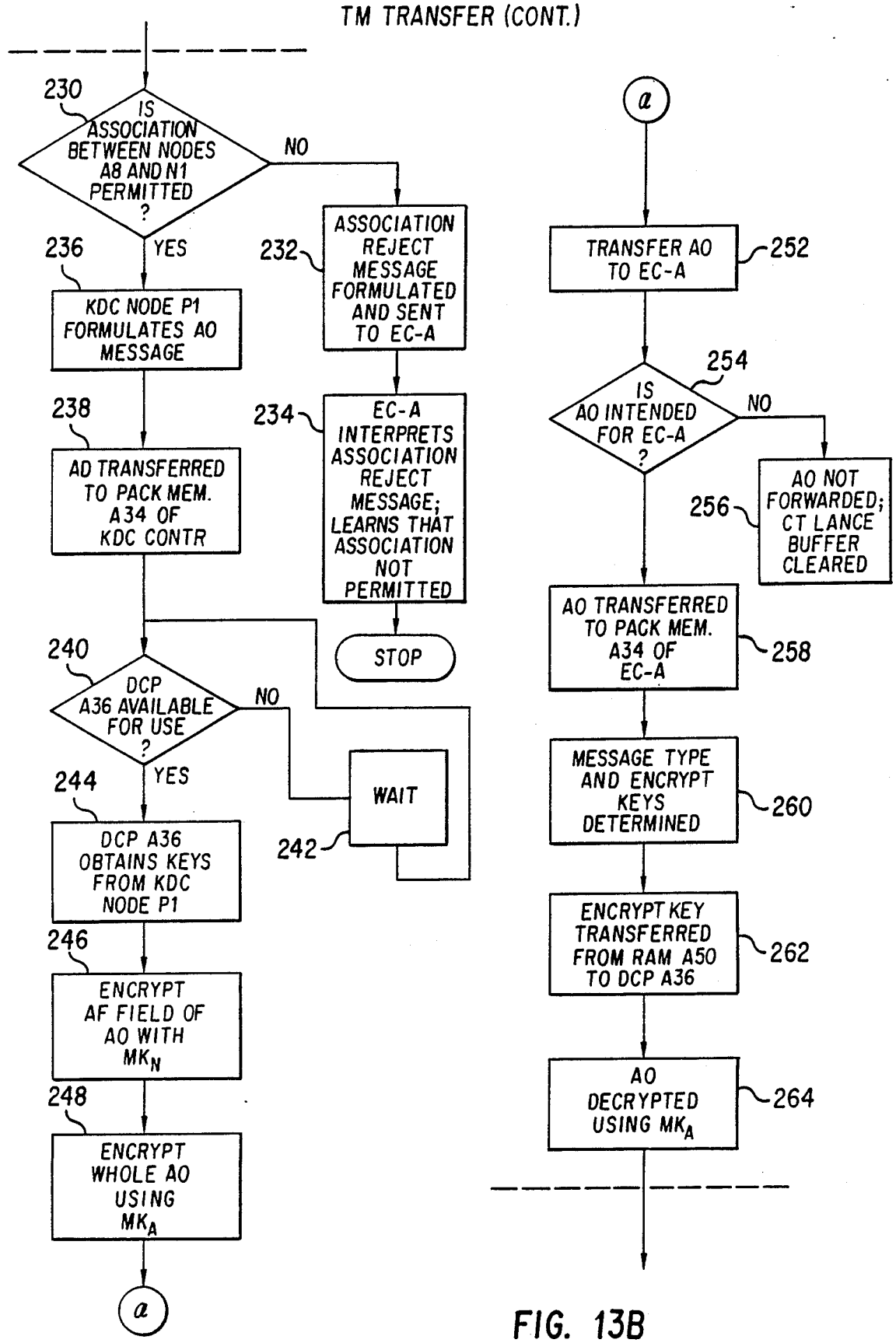

As shown in FIG. 13B, the next step in the transfer of the TM data packet and establishment of the secure connection, step 230, involves a determination by KDC node P1 of KDC controller 28 as to whether an association between the source node, node A8, and the destination node, node N1, is permitted. KDC node P1 maintains a network configuration table which holds association information concerning what associations are permitted between any two network nodes. The network configuration table is always ready for use in determining whether any association requests, as presented by AR messages, may be granted. The maintenance of associations by the network configuration table is performed in accordance with network configuration information reflecting the network security policies entered by trusted personnel. The network security policies determine which associations will be permitted by the network configuration table. The network configuration table may be used to indicate, for example, that node A4 may not communicate with any node which is directly linked to network cable 20. The network configuration table may also be used to indicate, for example, that node N4 may not receive information from any other node which is a "top secret" node, i.e., a node to which, or from which, top secret information is transferred. In accordance with the limitations imposed by the network policies, the network configuration table also indicates a maximum default length of time for associations.

If according to the network configuration table implementing the security policies of the network, an association which is requested by an AR message is not permitted, KDC node P1 formulates an association rejection message which is forwarded to packet memory A34 of KDC controller 28. Thereafter, the association rejection message is forwarded from packet memory A34 to CT LANCE A44 of KDC controller 28 and transferred through transceiver 24 over network cable 20 to encryption controller A (step 232). The association rejection message is received by encryption controller A in the same manner in which other messages are received by encryption controller A. Subsequently, the association rejection message stored in packet memory A34 of encryption controller A is interpreted by CPU A40 (step 234). Encryption controller A does not acknowledge that the association requested by the AR message has been rejected by KDC node P1. That is, an acknowledgement of the rejection is not sent from encryption controller A to KDC controller 28.

If the association requested by encryption controller A is permitted, according to the security policy of the network as implemented by the network configuration table, KDC node P1 formulates, in step 236, an association open (AO) message for transfer from KDC node P1 to encryption controller A. Among the information contained in the association open message is an association key (AK) to be used to encrypt the TM message originally transferred from node A8 to packet memory A34 of encryption controller A.

Different types of AO messages may be formulated by KDC node P1. For example, one type of AO message may be formulated when the two nodes between which a node frame is to be transferred are coupled to the same encryption controller. Yet another type of AO message may be formulated by KDC node P1 when one of the two nodes involved in a TM data packet transfer is coupled to an encryption controller and the other node is coupled directly to network cable 20. Yet another type of AO message is formulated by KDC node P1 when, as in the present case, each of the two nodes between which a TM data packet is to be transferred is attached to a separate encryption controller. The type of AO message transferred in the later case is as illustrated in and described in connection with FIG. 5. Such an AO message, as further described below contains enough information so that both encryption controllers are provided with the information, that is, keys and source and destination addresses used to allow transfer of the TM data packet and establishment of the secure connection.

The AO message as described in connection with FIG. 5 is formulated in unencrypted form by KDC node P1. KDC node P1 generates and includes in the AO message an association key (AK which is used by encryption controllers A and N to encrypt node frames transferred between nodes A8 and N1. In a following step 238, the unencrypted AO message is transferred to packet memory A34 of KDC controller 28. The AO message remains in packet memory A34 while DCP A36 is polled by CPU A40 to determine whether DCP A36 is presently available to encrypt the AO message (steps 240 and 242). Step 242 is typical of the wait undergone awaiting use of device, such as DCP A36. Subsequently, DCP A36 obtains the master key for encryption controller A, $MK_A$, and the master key for encryption controller N, $MK_N$. These master keys may be obtained from KDC node P1 in which the master keys are stored encrypted under the key encryption key for the KDC controller, KEK, after the formulated but unencrypted AO has been transferred from KDC node P1 (step 244) or may be obtained from KDC node P1 when the unencrypted AO message is forwarded to packet memory A34. In the next step, step 246, field 12 of the AO message, which contains an association forward (AF) message to be transferred from encryption controller A to encryption controller N in a subsequent step, is encrypted by DCP A36 using $MK_N$.

Field 12 of the AO message is $MK_N$-encrypted by KDC controller 28 before the AO message is transferred to encryption controller A because the master key for encryption controller N is not available to encryption controller A. The master key for encryption controller N is available to KDC controller 28, and, therefore, the AF message is $MK_N$-encrypted by KDC controller 28 before being transferred to encryption controller A for subsequent transfer to encryption controller N. Encryption controller N knows its own master key, and decrypts the AO message using that key, $MK_N$, when the AF message is received by encryption controller N. The whole AO message is encrypted using $MK_A$ (step 248).

Each time a message is sent by an encryption controller or KDC controller, an integrity check code is generated in accordance with the content of the message and included as part of the message. As described above, when the message is received by another controller, the message-receiving controller checks the integrity code against the message to determine if the message was deliberately modified before receipt. Receipt of a message which has been deliberately modified before receipt is an auditable event. Additional integrity check fields are also used to verify error-free transfer of encryption keys. For example, field 10 of the AO message contains an integrity check parameter for the association key contained in field 9 of the AO message.

Subsequently in a step 252, the AO message stored in packet memory A34, which has been encrypted by DCP A36, is transferred in the manner previously described over network cable 20 to encryption controller A.

Encryption controller A determines, in a step 254, whether the AO message received by CT LANCE A44 is intended for encryption controller A. If the AO message is not intended for encryption controller A, the buffer of CT LANCE A44 containing the AO message is cleared (step 256). On the other hand, if the AO message is intended for encryption controller A, the AO message is transferred from CT LANCE A44 to packet memory A34 of encryption controller A (step 258). CPU A40 determines the type of message received by packet memory A34 and the key under which the message is encrypted (step 260). Thereafter, the encryption key, under which the AO message is encrypted, is obtained from battery backup RAM A54, which is used by an encryption controller to store encryption keys, and transferred to DCP A36 (step 262). The encryption key, $MK_A$, is used in step 264 to decrypt the AO message.

Figure 13C:
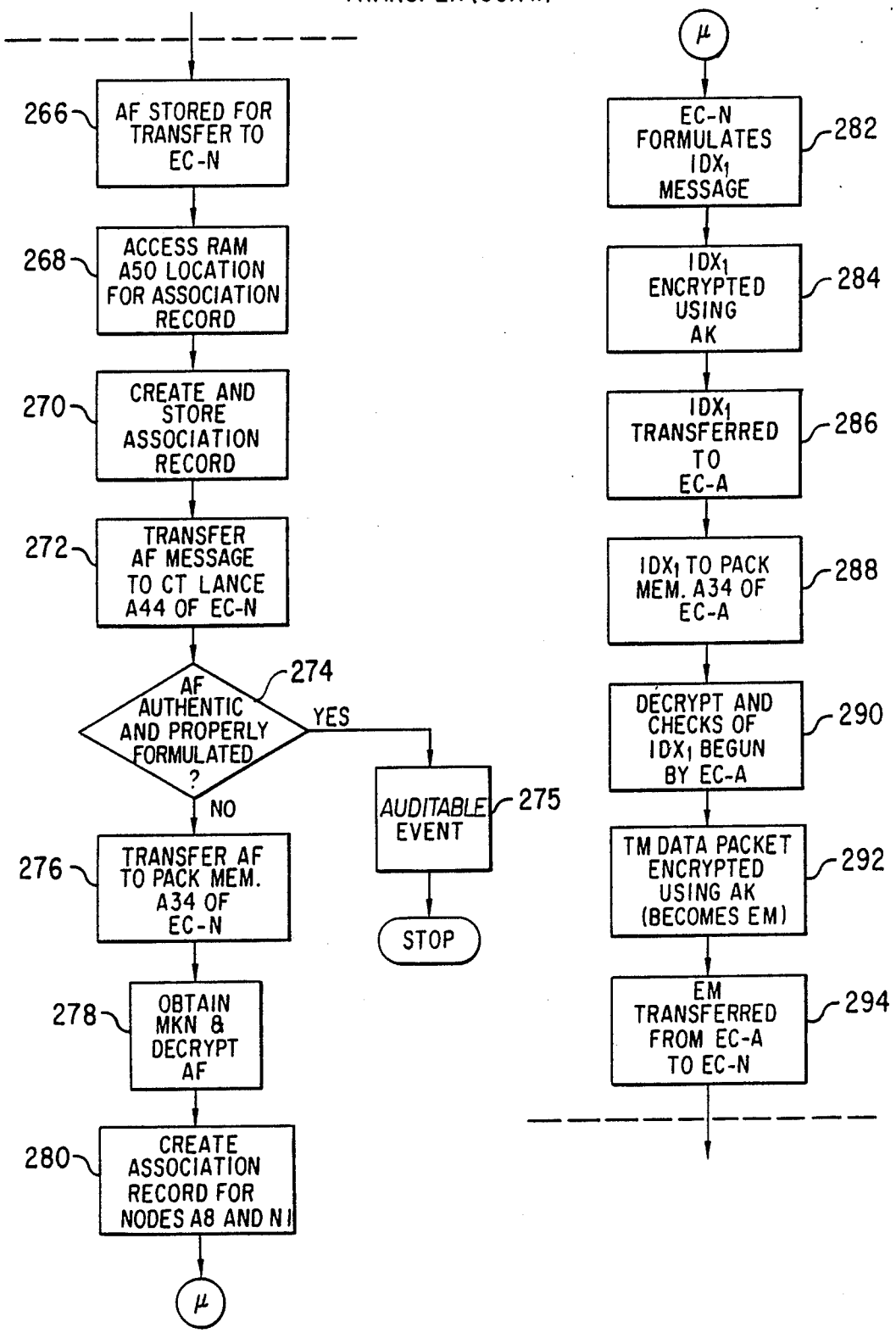
Figure 13D:
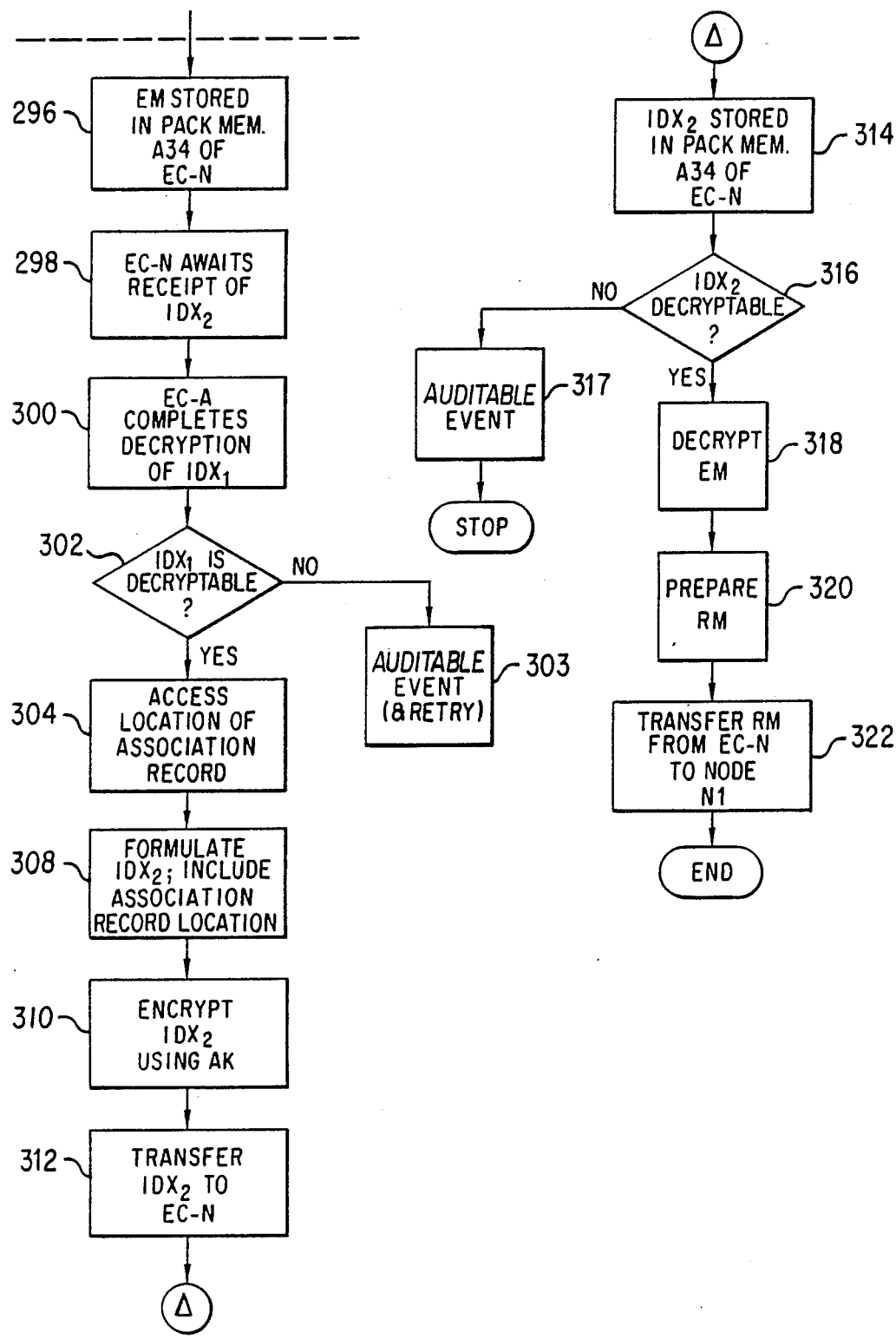

Referring to FIG. 13C, the AF message part of the AO message is decrypted and stored in packet memory A34 for later transfer to encryption controller N (step 266). Other portions of the AO message are used to create an association record for the source node connected to encryption controller A and the destination node connected to the encryption controller to which the AF is to be forwarded, encryption controller N.

As stated above, RAM A50 is used to store association records for source and destination nodes. When an AR message is formulated by and transferred from encryption controller A, a location in RAM A50 for storing an association record associated with the source and destination nodes indicated by the AR message is designated. Subsequently, when the AO message is received by encryption controller A from KDC controller 28, the source and destination node addresses contained in the AO message (fields 6 and 7) are used to access the location in RAM A50 used to store the association record for the source and destination nodes indicated (step 268). In a next step 270, the association record is formulated and stored.

The association record includes an indication of the length of the key used to encrypt node frames transferred between node A8 and node N1, namely, an indication of the length of the AK. The association record also includes the encryption parameter actually used to encrypt node frames transferred between nodes A8 and N1, that is, the full AK to be used (field 9 of the AO message). Furthermore, the association record includes an indication of the unexpired time for the association between the nodes. The alotted time for the association begins to run once the association record is created. Existing associations, having records, are ordered by the encryption controller according to length of time over which the association has existed. The oldest associations are periodically checked to confirm whether the association is still valid.

It is to be noted, that the TM data packet, which was transferred from node A8 to packet memory A34 of encryption controller A, remains in packet memory A34 while the AR message, AO message, and the AF message are transferred between encryption controllers A and N and KDC controller 28. The length of time after which the TM data packet has been received by packet memory A34 and before that data packet is transferred over network cable 20 to encryption controller N, and thereafter to node N1, is very small. The length of time is no more than one second and may be less than one tenth of a second.

The next step in the establishment of the secure connection between node A8 and node N1 takes place after the association record has been created in RAM A50 of encryption controller A. After the association record has been created, the AF message is transferred from packet memory A34 of encryption controller A to CT LANCE A44 of encryption controller A. Thereafter, the AF message is transferred through transceiver 22 over network cable 20 to encryption controller N (step 272). The AF message is received by encryption controller N through transceiver 26. The AF message is then forwarded from transceiver 26 to CT LANCE A44 of encryption controller N. Processing, as described in connection with the receipt of messages by encryption controller A, is also performed by encryption controller N to determine whether the AF message received by CT LANCE A44 is to be forwarded from CT LANCE A44 to packet memory A34 of encryption controller N (step 274).

Assuming that the AF message has been properly formulated and transferred to CT LANCE A44 of encryption controller N, and that no auditable event has been reported (step 275), the AF message is thereafter transferred from CT LANCE A44 to packet memory A34 of encryption controller N in a step 276. As described above, the AF message is encrypted using the master key for encryption controller N, $MK_N$. Accordingly, DCP A36 under control of CPU A40 accesses $MK_N$ from RAM A54 from encryption controller N. The key is then used by DCP A36 to decrypt the AF message (step 278). After the AF message has been decrypted, an association record for nodes A8 and N1 is created in RAM A50 of encryption controller N (step 280). As with the association record created in RAM A50 of encryption controller A for nodes A8 and N1, the association record, created in RAM A50 of encryption controller N, includes an indication of the length of the key used to encrypt the node frame, the encryption key itself, that is, the AK, and also an indication of the unexpired time for the association between nodes A8 and N1.

Prior to the actual transfer of the TM data packet from node A8 to node N1, it is desirable to obtain some indication that encryption controllers A and N agree on the association that now exists between nodes A8 and N1. Even though both encryption controllers A and N contain an association record, including an association key to be used when encrypting node frames, some last indication that the association keys to be used by the two encryption controllers is the same is preferably obtained before node frames are actually transferred. Accordingly, two identifier exchange (IDX) messages are transferred between encryption controllers N and A to verify that the association records, and more specifically, the association keys stored at the two encryption controllers, are the same and that transfer of encrypted TM data packets and subsequent decryption of TM data packets may be accomplished by the encryption controllers.

In a step 282, a first IDX message, $IDX_1$, is formulated by encryption controller N. The contents and format of the $IDX_1$ message are as generally described above in connection with FIG. 7. The formulated $IDX_1$ message is subsequently encrypted using the association key of AK for the association between nodes A8 and $N_1$ (step 284). The AK used to encrypt the $IDX_1$ message is obtained from the stored association record for the association contained in RAM A50 of encryption controller N. Thereafter, the $IDX_1$ message is transferred to encryption controller A in step 286 The message is received by CT LANCE A44 of encryption controller A and then transferred to packet memory A34 of the encryption controller.

In a step 290, encryption controller A begins to decrypt the $IDX_1$ message using the AK stored with the association record for nodes A8 and N1 in RAM A50 of encryption controller A. Obviously, successful decryption of the encrypted IDX message will occur only if the AKs for the two encryption controllers A and N are the same.

Meanwhile, with the expectation that the AK stored in RAM A50 of encryption controller A is identical to the AK of encryption controller N, and that therefore successful decryption of the $IDX_1$ message will occur, encryption controller A encrypts the TM data packet previously transferred to and stored in packet memory A34 (step 292). The AK for nodes A8 and N1, as stored at encryption controller A, is used to perform the encryption. The encrypted TM data packet (EM) is then transferred, in a step 294, from encryption controller A to encryption controller N in the manner described in connection with the transfer of other messages from encryption controller A to encryption controller N. As described above, additional fields are included in the EM data packet when the TM data packet is encrypted. As set forth in FIG. 13D, the EM data packet is stored in packet memory A34 of encryption controller N (step 296). The EM data packet is retained in packet memory A34 of encryption controller N until a second IDX message, $IDX_2$, is sent from encryption controller A to encryption controller N (step 298).

After the EM data packet has been transferred to encryption controller N, encryption controller A completes processing, that is, decryption of the first IDX message (step 300). If, as expected, the AK used to encrypt the $IDX_1$ message is the same as the AK in RAM A50 of encryption controller A, the $IDX_1$ message is uneventfully decrypted by encryption controller A. Alternatively, if the $IDX_1$ message cannot be properly decrypted using the AK stored at RAM A50 of encryption controller A, the attempt to establish a secure connection ends with an indication that an auditable event has occurred (steps 302 and 303). (Encryption controller N may try to pass $IDX_1$ to encryption controller N before the attempt to establish the secure connection is abandoned.) Successful decryption of the $IDX_1$ message reveals a message type indicator in field 4 which matches the unencrypted message type indicated in field 1 of the message. Successful decryption also reveals a correct sequence number in field 3 of the $IDX_1$ message.

Successful decryption of the $IDX_1$ message further reveals, in field 5 of the $IDX_1$ message, an indication of the address of RAM A50 of encryption controller N containing the association record for the nodes A8 and N1. This information is transferred to encryption controller A in order to permit encryption controller A to specify, when transferring messages to encryption controller N, at which location of encryption controller N's RAM A50 the association record of interest is stored. By specifying this location, the time required by encryption controller N to process messages subsequently transferred between the associated nodes (nodes A8 and N1) is reduced.

The next step in the establishment of the secure connection between nodes A8 and N1 involves the transfer of an $IDX_2$ message from encryption controller A to encryption controller N. The format of the $IDX_2$ message (formulated in step 308) is similar to that of the $IDX_1$ message. The $IDX_2$ message contains an indication of the location of RAM A50 of encryption controller A in which is stored the association record for nodes A8 and N1. This location is utilized to permit more efficient transfer of encrypted node frames from encryption controller N to encryption controller A. The location is included in messages transferred from encryption controller N to encryption controller A and directs encryption controller A to its association record for nodes N1 and A8.

The $IDX_2$ message is also encrypted using the AK for the association (step 310). In this instance, however, the AK used for the encryption is that available from RAM A50 of encryption controller A. Subsequently in step 312, the second IDX message is transferred from encryption controller A to encryption controller N and stored in packet memory A34 of encryption controller N (step 314). In step 316, encryption controller N attempts to decrypt the $IDX_2$ message. Decryption is possible if the AK stored at encryption N agrees with the AK stored at encryption controller A. An auditable event occurs if encryption controller N fails in its attempt to decrypt the $IDX_1$ message (step 317). The secure connection between nodes A8 and N1 is established and finally confirmed when encryption controller N, successfully decrypts the $IDX_2$ message, thus verifying that the association for nodes A8 and N1 is agreed upon by encryption controllers A and N.

The $IDX_2$ message must be received by encryption controller N before a predetermined time period has expired. The time period commences when the $IDX_1$ message is transferred from encryption controller N. If the $IDX_2$ message is not received within the predetermined time period, encryption controller N will resend the $IDX_1$ message to encryption controller A.

Once the secure connection between nodes A8 and N1 has been finally confirmed, the EM data packet previously received by encryption controller N and currently stored in packet memory A34 of encryption controller N, is decrypted by DCP A36 (step 318) using the AK for nodes A8 and N1 (stored in RAM A50). Following decryption of the EM data packet, a receive message (RM) data packet duplicating the original TM data packet is formulated in packet memory A34 (step 320) and transferred through PT LANCE A32 and concentrator A36 to node N1 (step 322). The contents and format of the RM data packet are as described above in connection with the figure illustrating the TM data packet, FIG. 3.

In connection with the transfer of encrypted TM packets, it should be noted that because of general restrictions on the length of data packets, TM packets, when encrypted to include additional fields may be too long. To avoid this problem, long TM data packets are actually transmitted as two encrypted packets, an EM start and an EM finish packet.

Once a valid association exists between nodes A8 and N1 or any other two nodes, only three of the steps described above are required to effect transfer of a node frame between the nodes. The unencrypted TM data packet needs to be transferred from the source node to the encryption controller to which the source node is connected. Thereafter, the encryption controller will determine that a valid association exists and will encrypt the TM data packet using the AK for the association between the source and destination nodes stored in RAM A50. The encrypted TM data packet or EM may then be transferred to the encryption controller to which the destination node is connected. This may be done without the transfer of AO, AF, and IDX messages because a valid association exists between the source and destination nodes and such an association need not be created by use of the AO, AF and IDX messages. Once the EM data packet has been received by the encryption controller to which the source node is connected, the encryption controller may decrypt the EM data packet and transfer the RM data packet to the source node.

Since both the encryption controllers to which the source and destination nodes are attached contain association records for the association between the source and destination nodes, TM data packets or node frames may be transferred from either the source node to the destination node or from the destination node to the source node, once the valid association has been created. Again, once the association has been created the abbreviated process described above is used to transfer data nodes and the complete process for establishing the secure connection need not be repeated at least for the time during which the association is valid, that is, for the time before the association expires, as at the end of a 28 hour period which normally defines the length of time over which an association is valid.

In addition to the exchange of messages described above, encryption controllers A and N also exchange or transfer to KDC controller 28 status messages. The status messages inform KDC controller 28, at regular intervals, of the status of encryption controllers A and N. The status messages include information such as the elapsed time since the initialization of a controller, and the elapsed time since the encryption controller last changed its state. Also, when an encryption controller is in a fault state, the status messages include an error field which specifies the nature of the problem bringing about the fault state.

As described above, KDC node P1 which is connected to KDC controller 28 generates a unique service key (SK) for each encryption controller. The SK is generated prior to initialization of an encryption controller. The SK is retained by KDC node P1 and stored in encrypted form. The SK for each encryption controller is also transferred to that encryption controller during that initialization and is retained in battery back-up RAM A54 of the encryption controller. The status messages informing KDC controller 28 of the status of the encryption controllers are transferred to KDC controller 28 in encrypted form. Specifically, status messages from any encryption controller are transferred to KDC controller 28 encrypted with the SK for that encryption controller. A status message from an encryption controller may be transferred to KDC controller 28 in response to a status request message from KDC controller 28. A status request message would be transferred to an encryption controller in encrypted form. The master key for the encryption controller would be used to encrypt a status request message from KDC controller 28.

In a network in which messages placed on a common network cable are available to all nodes of the system, the present invention provides apparatus and a method for securing transmission of data over the common network cable. According to the present invention, data which is still available over the unsecure common network cable may be received and deciphered only by those nodes for which the data it intended.

Although a preferred embodiment of the present invention is described in detail above, it should be apparent to those skilled in the art that various modifications may be made to the apparatus and method described above, for securing transmission of data over an unsecure transmission line, without departing from the scope or spirit of the invention. One obvious set of variations which may be made involve modifications to the message formats. Thus, it is intended that the invention cover modifications and variations of the invention provided they come within the scope of the appended claims and their legally entitled equivalents.

What is claimed is:

1. An encryption controller connected between a source node and an unsecured data transmission channel for transmitting data packets from the source node in a secure manner over the unsecured channel, the encryption controller comprising:

transceiver means, coupled to the unsecured channel, for exchanging data packets between the unsecured channel and the encryption controller;

receiver means for receiving an encrypted data packet from the source node for transmission over the unsecured channel to a destination node;

data packet memory means for storing the unencrypted data packet received from the source node;

means, responsive to the receipt of the unencrypted data packet, for forming a key request data packet for transmission via the transceiver means over the unsecured channel to a key distribution node, to request assignment of an association key for use in encrypting data packets to be transmitted from the source node to the destination node, the key request data packet including an address identifying the destination node;

decryption means for decrypting a message portion of an association open data packet received via the transceiver means over the unsecured channel from the key distribution node with a first master encryption key unique to the encryption controller, the message portion of the association open data packet being encrypted according to the first master encryption key and including an association key and a message field containing the association key encrypted according to a second master encryption key unique to the destination node;

means for assembling an association setup data packet for transmission via the transceiver means over the unsecured channel to the destination node, the association setup data packet having a message portion that includes the encrypted message field from the association open data packet containing the association key encrypted according to the second master encryption key; and encryption means for encrypting the unencrypted data packet stored in the data packet memory means according to the association key for transmission via the transceiver means over the unsecured channel to the destination node.

2. The encryption controller of claim 1 further comprising:
   means, coupled to the data packet memory means, for calculating an integrity code check of each of the data packets to be transmitted over the unsecured channel and for including the integrity code check in the data packet.

3. The encryption controller of claim 1 wherein the receiver means includes concentrator means for connecting a plurality of source nodes to the encryption controller for receiving unencrypted data packets from each of the plurality of source nodes.

4. The encryption controller of claim 3 wherein
   the unencrypted data packet includes an address identifying the source node; and
   the encryption controller further comprises
   means, responsive to the receipt of the unencrypted data packet, for comparing the address identifying the source node in the unencrypted data packet with the actual source node from which the unencrypted data packet was received, and
   means, responsive to the comparing means, for assembling an auditable event data packet indicating an attempted security violation, for transmission via the transceiver means over the unsecured channel to the key distribution node, when the address identifying the source node in the encrypted data packet and the actual source node are not the same.

5. The encryption controller of claim 1, further comprising:
   association memory means for storing association records of the source node and various destination nodes, the association records including association keys corresponding to the various destination nodes; and
   search means, responsive to the receipt of the unencrypted data packet, for searching the association memory means to locate a valid association key corresponding to the destination node.

6. The encryption controller of claim 5, further comprising:
   means, coupled to the association memory means, for periodically disabling certain association keys stored in the association memory means thereby rendering those association keys invalid.

7. The encryption controller of claim 1, further comprising:
   secure memory means for storing encryption keys for use in encrypting and decrypting data packets transmitted and receive over the unsecured data transmission channel;
   means for formulating an initialization request data packet for transmission via the transceiver means over the unsecured channel to a key distribution node, the initialization request data packet including an identification of the encryption controller;
   second decryption means for decrypting a message portion of an initialization data packet received via the transceiver means from the key distribution node over the unsecured channel with an initialization key stored in the secure memory means, the message portion of the initialization data packet being encrypted according to the initialization key and including the first master encryption key unique to the encryption controller, and for storing the first master encryption key in the secure memory means.

8. The encryption controller of claim 7, further comprising:
   a numerical keypad, coupled to the secure memory means, for manual entry of the initialization key.

9. The encryption controller of claim 7, further comprising:
   means, coupled to the secure memory means, for erasing the encryption keys stored in the secure memory means when the encryption controller is physically compromised.

10. The encryption controller of claim 1, further comprising:
    second decryption means for decrypting a first identifier exchange data packet received via the transceiver means over the unsecured channel from the destination node with the association key, the identifier exchange data packet being encrypted according to the association key; and
    second encryption means, responsive to the second decryption means, for encrypting a second identifier exchange data packet according to the association key, for transmission via the transceiver means over the unsecured channel to the destination node, when the first identifier exchange data packet is successfully decrypted.

11. A method of operating an encryption controller connected between a source node and an unsecured data transmission channel for transmitting data packets from the source node in a secure manner over the unsecured channel, the method comprising the steps of:
    receiving an unencrypted data packet from the source node for transmission over the unsecured channel to a destination node;
    storing the unencrypted data packet received from the source node;
    forming a key request data packet including an address identifying the destination node;
    transmitting the key request data packet over the unsecured channel for receipt by a key distribution node to request assignment of an association key for use in encrypting data packets to be transmitted from the source node to the destination node;
    receiving an association open data packet sent from the key distribution node over the unsecured channel, the association open data packet having a message portion encrypted according to a first master encryption key unique to the encryption controller, the message portion of the association open data packet including an association key and a message field containing the association key encrypted according to a second master encryption key unique to the destination node;
    decrypting the message portion of the association open data packet including the association key with the first master encryption key;
    assembling an association setup data packet having a message portion that includes the encrypted message field from the association open data packet containing the association key encrypted according to the second master encryption key;
    transmitting the association setup data packet over the unsecured channel for receipt by the destination node;

encrypting the unencrypted data packet stored in the data packet memory means according to the association key; and transmitting the encrypted data packet over the unsecured channel for receipt by the destination node.

12. The method of claim 11, further comprising the step of:

calculating an integrity code check of each of the data packets to be transmitted over the unsecured channel and including the integrity code check in the data packet.

13. The method of claim 11, wherein the encryption controller is connected to a plurality of source nodes, and unencrypted data packet includes an address identifying the source node, the method further comprising the steps of:

comparing the address identifying the source node in the unencrypted data packet with the actual source node from which the unencrypted data packet was received;

assembling an auditable event data packet indicating an attempted security violation when the address identifying the source node in the unencrypted data packet and the actual source node are not the same, and transmitting the auditable event data packet over the unsecured channel for receipt by the key distribution node.

14. The method of claim 11, further comprising the steps of:

storing association records of the source node and various destination nodes in an association memory, the association records including association keys corresponding to the various destination nodes; and searching the association memory to locate a valid association key corresponding to the destination node when the unencrypted data packet is received from the source node.

15. The method of claim 14, further comprising the steps of:

periodically disabling certain association keys stored in the association memory thereby rendering those association keys invalid.

16. The method of claim 11, further comprising the steps of:

storing encryption keys in a secure memory for use in encrypting and decrypting data packets transmitted and received over the unsecured channel;

formulating an initialization request data packet including an identification of the encryption controller;

transmitting the initialization request data packet over the unsecured channel for receipt by a key distribution node;

receiving an initialization data packet sent from the key distribution node over the unsecured channel, the initialization data packet having a message portion encrypted according to an initialization key stored in the secure memory means, the message portion of the initialization packet including the first master encryption key unique to the encryption controller; and decrypting the message portion of the initialization data packet including the first master encryption key with the initialization key and storing the first master encryption key in the secure memory means.

17. The method of claim 16, further comprising the step of:

manually entering the initialization key for storage in the secure memory means.

18. The method of claim 16, further comprising the step of:

erasing the encryption keys stored in the secure memory means when the encryption controller is physically compromised.

19. The method of claim 11, further comprising the steps of:

receiving a first identifier exchange data packet sent from the destination node over the unsecured channel, the identifier exchange data packet being encrypted according to the association key;

decrypting the first identifier exchange data packet with the association key;

encrypting a second identifier exchange data packet with the association key when the first identifier exchange data packet is successfully decrypted; and transmitting the encrypted second identifier exchange data packet over the unsecured data for receipt by the destination node.

* * * * *

UNITED STATES PATENT AND TRADEMARK OFFICE
CERTIFICATE OF CORRECTION

PATENT NO. : 4,924,513

DATED : May 08, 1990

INVENTOR(S) : B.J. Herbison et al.

It is certified that error appears in the above-identified patent and that said Letters Patent is hereby corrected as shown below:

Claim 1, column 26, line 36, change "encrypted" to --unencrypted--.

Claim 7, column 27, line 56, change "receive" to --received--.

Signed and Sealed this

Thirty-first Day of December, 1991

*Attest:*

HARRY F. MANBECK, JR.

*Attesting Officer*     *Commissioner of Patents and Trademarks*